US007367666B2

(12) United States Patent
Doi
(10) Patent No.: US 7,367,666 B2
(45) Date of Patent: May 6, 2008

(54) INK JET RECORDING METHOD AND INK JET RECORDING APPARATUS

(75) Inventor: Takatsugu Doi, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 390 days.

(21) Appl. No.: 11/130,868

(22) Filed: May 17, 2005

(65) Prior Publication Data

US 2005/0264630 A1 Dec. 1, 2005

(30) Foreign Application Priority Data

May 31, 2004 (JP) ............................ 2004-161266
Feb. 8, 2005 (JP) ............................ 2005-032311

(51) Int. Cl.
*C09D 11/00* (2006.01)

(52) U.S. Cl. ................ 347/100; 106/31.13; 106/31.27; 106/31.6; 106/31.33; 106/31.65

(58) Field of Classification Search ................ 347/100; 106/31.13, 31.27, 31.6, 31.33, 31.65
See application file for complete search history.

(56) References Cited

U.S. PATENT DOCUMENTS

2006/0066661 A1 * 3/2006 Yamashita et al. ............ 347/21

FOREIGN PATENT DOCUMENTS

JP 2667401 12/1988
JP 9-254376 9/1997
JP 2001-294788 10/2001
JP 2001294788 A * 10/2001

* cited by examiner

*Primary Examiner*—Manish S. Shah
*Assistant Examiner*—Laura E. Martin
(74) *Attorney, Agent, or Firm*—Fildes & Outland, P.C.

(57) ABSTRACT

An inkjet recording method which prints out by ejecting onto a recording medium an ink set for inkjet use, wherein the ink set includes at least: a first liquid containing at least a coloring material, a water soluble solvent and water; a second liquid containing at least a coagulant, a water soluble solvent and water; and a third liquid containing at least a coagulant, a water soluble solvent and water; wherein, (A) printing modes include a single sided printing mode and a double sided printing mode, (B) when the single sided printing mode is selected printing is carried out by ejecting the first liquid and the second liquid, (C) when the double sided printing mode is selected printing is carried out by ejecting the first liquid and the third liquid, (D) the relationship $0.01<(P_{1-3})/(P_{1-2})<1$ is substantially satisfied where $(P_{1-2})$ represents the number of coarse particles of size 1 μm or larger of a mixed liquid, mixed in the application ratio per unit of surface area when the single sided printing is selected, of the first liquid and the second liquid, and where $(P_{1-3})$ represents the number of coarse particles of size 1 μm or larger of the mixed liquid, mixed in the application ratio per unit of surface area when the double sided printing is selected, of the first liquid and the third liquid.

Also, an apparatus which uses this recording method is described.

20 Claims, 5 Drawing Sheets

IMAGE PATTERN C

IMAGE PATTERN A

LIQUID 1 + LIQUID 2
(SINGLE SIDED PRINTING MODE)
LIQUID 1 + LIQUID 3
(DOUBLE SIDED PRINTING MODE)

INK JET RECORDING METHOD AND INK JET RECORDING APPARATUS

CROSS-REFERENCE TO RELATED APPLICATION

This application claims priority under 35 USC 119 from Japanese Patent Application Nos. 2004-161266 and 2005-032311, the disclosures of which are incorporated by reference herein.

BACKGROUND OF THE INVENTION

1. Field of the Invention

The present invention is related to an inkjet recording method and inkjet recording apparatus.

2. Description of the Related Art

Inkjet type printing, where ink is ejected from ink ejection ports formed from nozzles, slits, porous films and the like, is used on many printing type printers because of the compact size and low cost. Within inkjet type printing there are the following types which are superior in the provision of high resolution and high speed printing characteristics: piezo inkjet type, where the change in shape of piezoelectric elements is used to eject ink; together with, thermal inkjet type, where thermal energy causing a boiling phenomenon is used to eject the ink, Currently one of the important issues raised is increasing inkjet printing speeds and raising image quality when printing on ordinary paper. In order to achieve this there are image forming methods proposed (for example see Japanese Patent No. 2667401) where after a liquid, which comprises compounds with cation groups, is applied to a recording medium, and then the liquid penetrates into the recording medium, remaining in the medium. Then as soon as the liquid has disappeared from the surface of the medium, inks containing anion dyes are applied to form images.

Also proposed (for example see JPA No. 2001-294788) are color ink sets with the aim of high speed drying properties, high optical density, raised image quality comprising: black inks containing water and water-soluble solvents, where the drying time with ordinary paper is 5 seconds or less; color inks containing coloring materials, water, water soluble solvents, and coagulants which coagulate components of black ink, giving a drying-time of 5 seconds or less with ordinary paper.

Further still are proposed (for example see JPA No. 9-254376) methods of inkjet printing which allow double sided printing to be carried out on a recording medium comprising: selecting either double sided or single sided printing modes; when the double sided printing mode is selected then selecting a mode from between a treatment liquid using printing mode, where application of a treatment liquid is made to the recording medium, or a low density print mode, where the amount of ink ejected is decreased for the recording medium.

However, in the above methods, because the aim is to improve image quality, in the likes of optical density, bleeding, and inter color bleeding, not enough consideration has been made of drying time or fixation time. In particular, when undertaking high speed printing at the same time as double sided printing, because of contact of the printed surface with feeding rollers and such paper conveying structural elements just after printing, coloring material can get stuck to the paper conveying structural elements. This stuck on coloring material can be re-transferred onto the image area and it has become clear that dirty images can occur. Because of this, a technology which will provide satisfactory drying times and fixation properties, as well as improving image quality such as optical density, bleeding, and inter color bleeding, is required.

SUMMARY OF THE INVENTION

A first aspect of the present invention is an inkjet recording method which prints out by ejecting onto a recording medium an ink set for inkjet use, wherein the ink set comprises at least: a first liquid containing at least a coloring material, a water soluble solvent and water; a second liquid containing at least a coagulant, a water soluble solvent and water; and a third liquid containing at least a coagulant, a water soluble solvent and water. Wherein, (A) printing modes comprise a single sided printing mode and a double sided printing mode, (B) when the single sided printing mode is selected printing is carried out by ejecting the first liquid and the second liquid, (C) when the double sided printing mode is selected printing is carried out by ejecting the first liquid and the third liquid, (D) the relationship $0.01<(P_{1-3})/(P_{1-2})<1$ is substantially satisfied where $(P_{1-2})$ represents the number of coarse particles of size 1 μm or larger of a mixed liquid, mixed in the application ratio per unit of surface area when the single sided printing is selected, of the first liquid and the second liquid, and where $(P_{1-3})$ represents the number of coarse particles of size 1 μm or larger of the mixed liquid, mixed in the application ratio per unit of surface area when the double sided printing is selected, of the first liquid and the third liquid.

A second aspect of the present invention is an inkjet recording apparatus provided with a recording head which prints out by ejecting onto a recording medium an ink set for inkjet use, wherein the ink set comprises at least: a first liquid containing at least a coloring material, a water soluble solvent and water; a second liquid containing at least a coagulant, a water soluble solvent and water; and a third liquid containing at least a coagulant, a water soluble solvent and water. Wherein, (A) the apparatus is configured for printing modes comprising a single sided printing mode and a double sided printing mode, (B) when the single sided printing mode is selected printing is carried out by ejecting the first liquid and the second liquid, (C) when the double sided printing mode is selected printing is carried out by ejecting the first liquid and the third liquid, (D) the relationship $0.01<(P_{1-3})/(P_{1-2})<1$ is substantially satisfied where $(P_{1-2})$ represents the number of coarse particles of size 1 μm or larger of the mixed liquid, mixed in the application ratio per unit of surface area when the single sided printing is selected, of the first liquid and the second liquid, and where $(P_{1-3})$ represents the number of coarse particles of size 1 μm or larger of the mixed liquid, mixed in the application ratio per unit of surface area when the double sided printing is selected, of the first liquid and the third liquid.

DETAILED DESCRIPTION OF THE INVENTION

Figure 1:
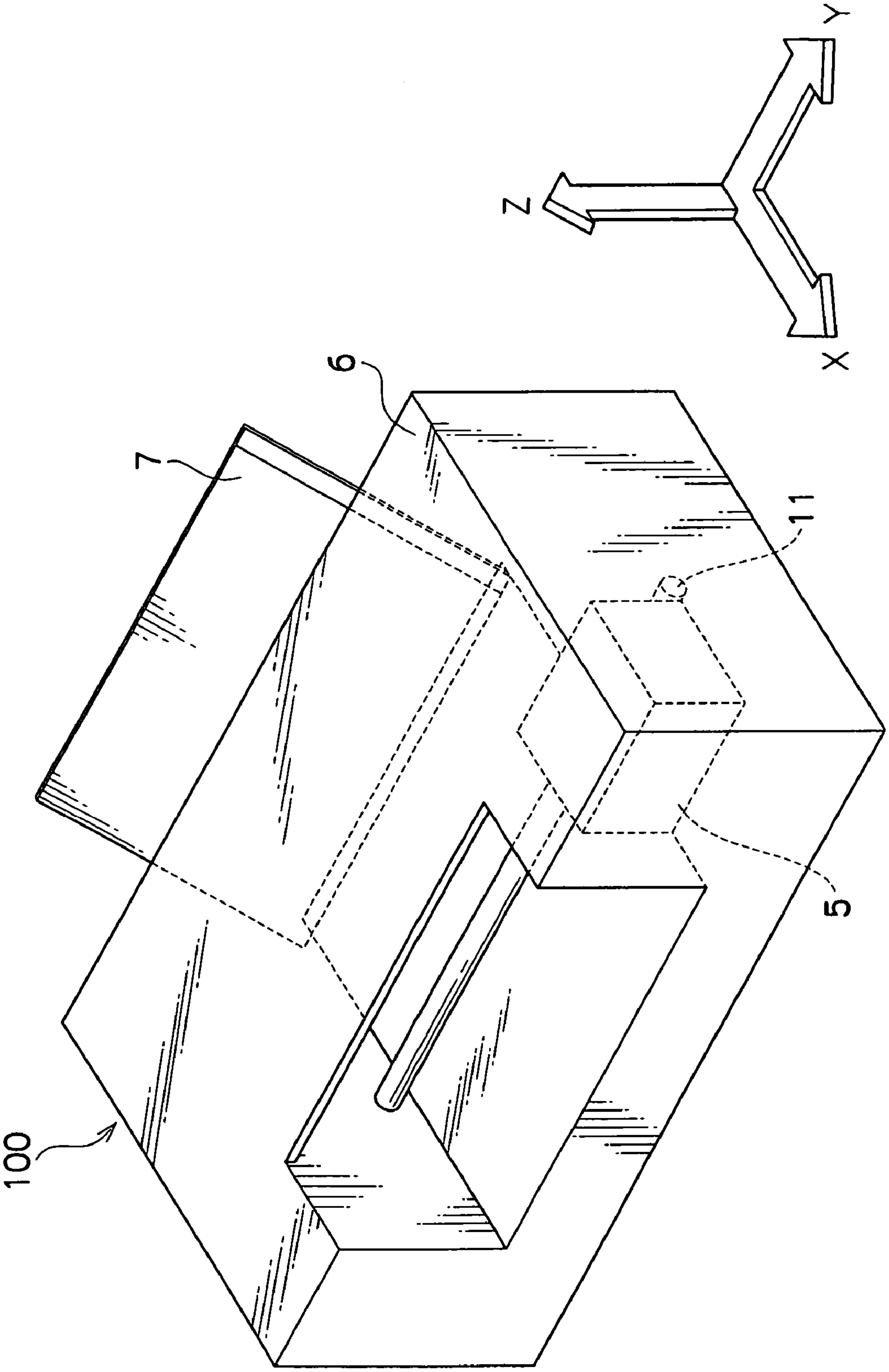
FIG. 1 is a perspective view of the external construction of a preferred embodiment of an inkjet recording apparatus of the present invention.

Preferred aspects of the inkjet recording method of the present invention are listed:

(1) the number of coarse particles ($P_{1-2}$) and the number of coarse particles ($P_{1-3}$) are both about 5,000 or more particles per μl to about 5,000,000 particles per μl;

(2) for printing of the same color, the application amount of liquid per pixel in the single sided printing mode is substantially the same as or more than the application amount of liquid per pixel in the double sided printing mode;

(3) the application ratio per unit surface area is adjusted to an appropriate amount, by adjusting the number of pixels applied of the first liquid and/or the second liquid, for printing in the single sided printing mode; and, the application ratio per unit surface area is adjusted to an appropriate amount, by adjusting the number of pixels applied of the first liquid and/or the third liquid, for printing in the double sided printing mode;

(4) the application ratio per unit surface area is adjusted to an appropriate amount, by adjusting the amount of the first liquid and/or the second liquid applied per pixel, for printing in the single sided printing mode; and, the application ratio per unit surface area is adjusted to an appropriate amount, by adjusting the amount of the first liquid and/or the third liquid applied per pixel, for printing in the double sided printing mode;

(5) in (4) above, the amount of the first liquid and/or the second liquid applied per pixel is adjusted by changing the shape of the wave of the voltage applied to the first liquid and/or the second liquid; and, the amount of the first liquid and/or the third liquid applied per pixel is adjusted by changing the shape of the wave of the voltage applied to the first liquid and/or the third liquid;

(6) the amounts of the first liquid, the second liquid and the third liquid applied per pixel are each about 0.01 ng to about 25 ng;

(7) in the single sided printing mode, the ratio by mass of the amounts of the first liquid to the second liquid applied per pixel is between about 100:5 and about 100:100; and, in the double sided printing mode, the ratio by mass of the amounts of the first liquid to the third liquid applied per pixel is between about 100:1 and about 100:50;

(8) the first liquid additionally comprises a polymer;

(9) in (8) above the acid value of the polymer is about 30 KOHmg/g to about 150 KOHmg/g;

(10) in (8) above the acid value of the polymer is about 150 KOHmg/g to 1000 KOHmg/g; and, the degree of neutralization of the polymer is about 20% to 80%;

(11) in (8) above the polymer has a mass average molecular weight of about 2,000 to about 1,000,000;

(12) the second liquid and/or the third liquid additionally comprise a coloring material;

(13) the coloring material of the first liquid is a pigment, and the pigment is at least one selected from the group of pigments comprising a pigment which is dispersed by a polymer dispersing agent; a pigment which is self dispersible in water; a pigment which has a resin covering; and, a pigment which is a graft polymer pigment;

(14) the volume average particle size of the coloring material is about 30 nm to about 250 nm;

(15) the coloring material of the first liquid is a dye;

(16) the coagulant in the second liquid and the coagulant in the third liquid are different from each other;

(17) the coagulant(s) are at least one selected from the group of substances consisting of an inorganic electrolyte, an organic amine compound, and an organic acid;

(18) the surface tension of the first liquid is about 20 mN/m to 60 mN/m;

(19) the surface tensions of the second liquid and the third liquid are about 20 mN/m to 45 mN/m;

(20) the viscosities of the first liquid, the second liquid and the third liquid are about 1.2 mPa·s to 8.0 mPa·s.

Preferred aspects of the inkjet recording apparatus of the present invention will be listed:

<1> the number of coarse particles ($P_{1-2}$) and the number of coarse particles ($P_{1-3}$) are both about 5,000 particles per μl to about 5,000,000 particles per a μl;

<2> for printing of the same color, the application amount of liquid per pixel in the single sided printing mode is substantially the same as or more than the application amount of liquid per pixel in the double sided printing mode;

<3> the application ratio per unit surface area is adjusted to an appropriate amount, by adjusting the number of pixels applied of the first liquid and/or the second liquid, for printing in the single sided printing mode; and, the application ratio per unit surface area is adjusted to an appropriate amount, by adjusting the number of pixels applied of the first liquid and/or the third liquid, for printing in the double sided printing mode;

<4> the application ratio per unit surface area is adjusted to an appropriate amount, by adjusting the amount of the first liquid and/or the second liquid applied per pixel, for printing in the single sided printing mode; and, the application ratio per unit surface area is adjusted to an appropriate amount, by adjusting the amount of the first liquid and/or the third liquid applied per pixel, for printing in the double sided printing mode;

<5> in <4> above, the amount of the first liquid and/or the second liquid applied per pixel is adjusted by changing the shape of the wave of the voltage applied to the first liquid and/or the second liquid; and, the amount of the first liquid and/or the third liquid applied per pixel is adjusted by changing the shape of the wave of the voltage applied to the first liquid and/or the third liquid;

<6> the amounts of the first liquid, the second liquid and the third liquid applied per pixel are each about 0.01 ng to about 25 ng;

<7> in the single sided printing mode, the ratio by mass of the amounts of the first liquid to the second liquid applied per pixel is between about 100:5 and about 100:100; and, in the double sided printing mode, the ratio by mass of the amounts of the first liquid to the third liquid applied per pixel is between about 100:1 and about 100:50.

The present invention provides a inkjet recording method and a inkjet recording apparatus which enable the improvement of optical density, bleeding, and inter color bleeding whilst also providing satisfactory drying times and fixation properties, thereby making it possible to prevent dirty images.

The inkjet recording method and inkjet recording apparatus of the invention will be described in detail below.

<<Inkjet Recording Method>>

The inkjet recording method of the present invention is an inkjet recording method which prints out by ejecting onto a recording medium an ink set for inkjet use, characterized by the ink set comprising at least: a first liquid containing at least a coloring material, a water soluble solvent and water;

a second liquid containing at least a coagulant, a water soluble solvent and water; and a third liquid containing at least a coagulant, a water soluble solvent and water. Wherein, (A) printing modes comprise a single sided printing mode and a double sided printing mode, (B) when the single sided printing mode is selected printing is carried out by ejecting the first liquid and the second liquid, (C) when the double sided printing mode is selected printing is carried out by ejecting the first liquid and the third liquid, (D) the relationship $0.01<(P_{1-3})/(P_{1-2})<1$ is substantially satisfied where $(P_{1-2})$ represents the number of coarse particles of size 1 μm or larger of a mixed liquid, mixed in the application ratio per unit of surface area when the single sided printing is selected, of the first liquid and the second liquid, and where $(P_{1-3})$ represents the number of coarse particles of size 1 μm or larger of a mixed liquid, mixed in the application ratio per unit of surface area when the double sided printing is selected, of the first liquid and the third liquid.

Here, in the current invention, there is at least one different component among the necessary components or optional components of the liquids making up the second and third liquids. As stated previously, it is preferable that the coagulant of the second liquid and the coagulant of the third liquid are different from each other.

The way in which the image quality in terms of optical density, bleeding, color bleeding is raised by using the mixing of two or more liquids, such as the first, second and third liquids of the invention, using a liquid which increases viscosity or generates coagulation is known. This mechanism can be thought of as two actions:

(i) the coloring material of the first liquid is rapidly coagulated, and the coloring material is separated from the aqueous medium of the water and water soluble solvent (cohesiveness); and (ii) only the aqueous solution penetrates the recording material (permeability).

When the coagulation ability is sufficiently great to the permeability then raised image quality can be sufficiently realized, however, it tends to extend the drying time. On the other hand, when the permeability is sufficiently high to the coagulation ability then the drying time gets quicker but the ability to realize raised image quality is lost.

In the past, emphasis has been put on improving optical density, bleeding, and inter color bleeding and so ink sets have been designed where the coagulation ability is sufficiently great to the permeability. As a result of this, it has become clear that ink sets like this generate dirty images, especially when applied to high speed printing combined with double sided printing. The mechanism of the generation of dirty images is not clear but it can be supposed that the cause is that when the coagulation ability becomes greater than the permeability then the drying time becomes unable to cope with high speed printing, and the amount of coloring material which remains on the surface of the recording material becomes great. Put in another way, a condition is formed where on the surface of the recording material is a large amount of coloring material that has not sufficiently dried. It can be supposed that this non-dry coloring material accumulates on the paper conveying elements, such as the feeding rollers, and these parts retransfer the coloring material to the recording medium, causing the dirty images.

In order to solve this drawback, it is proposed that when double sided printing the application amount of the ink (first liquid) is reduced. However, even with this method, the occurrence of localized dirty images which high speed double sided printing has been proven. It is supposed to be because in areas where there is sufficient treating liquid (second and third liquids) in order to be able to print with the ink (first liquid), when the ink application areas are looked at, the ink drying is slow, and there is a condition where there is a great amount of coloring material.

As a result of extensive investigations the present invention has been made which provides an inkjet recording method with improved optical density, bleeding, and inter color bleeding properties as well as speeding the drying time of the ink (coloring material). This makes it possible to prevent the occurrence of dirty images when carrying out single sided printing using the first and second liquids, or when carrying out double sided printing using the first and third liquids. In order to do this it is necessary that: the application ratio per unit area of particles of size 1 μm or over in the mixture liquid of the first liquid and the second liquid for single sided printing mode (coarse particle count: $P_{1-2}$) is greater than the application ratio per unit area of particles of size 1 μm or over in the mixture liquid of the first liquid and the third liquid for double sided printing mode (coarse particle count: $P_{1-3}$).

In other words, when printing by ejecting the first, second and third liquids in a condition wherein the coarse particle count $(P_{1-2})$ is greater than the coarse particle count $(P_{1-3})$ then the above described result can be obtained.

In the inkjet recording method of the present invention it is necessary that $0.01<(P_{1-3})/(P_{1-2})<1$ but it is preferable that the value of $(P_{1-3})/(P_{1-2})$ is in the range of about 0.1 to about 1, and more preferable that value is in the range of about 0.75 to about 0.9. If $(P_{1-3})/(P_{1-2})$ is greater than 1 then the speed of drying of the coloring material becomes slow, and dirty images occur. However, if $(P_{1-3})/(P_{1-2})$ is less than 1 then there is the problem that sufficient optical density cannot be achieved.

Here the coarse particle count $(P_{1-2})$ application ratio per unit area of particles of size 1 μm or over in the mixture liquid of the first liquid and the second liquid is an appropriate amount when the single sided printing mode is selected, however, in this case the application ratio per unit area is: preferably first liquid: second liquid=about 100:5 to about 100:100; more preferably first liquid: second liquid=about 100:5 to about 100:50; and, still more preferably first liquid: second liquid=about 100:10 to about 100:20. Outside of these ranges deterioration in optical density, bleeding and inter color bleeding properties, curl and cockling of the recording medium may get worse.

Also, the coarse particle count $(P_{1-3})$ application ratio per unit area of particles of size 1 μm or over in the mixture liquid of the first liquid and the third liquid is an appropriate amount when the double sided printing mode is selected, however, in this case the application ratio per unit area is: preferably first liquid: third liquid=about 100:1 to about 100:50; more preferably first liquid: third liquid=about 100:1 to about 100:25; and, still more preferably first liquid: third liquid=about 100:2 to about 100:15. Outside of these ranges deterioration in optical density, bleeding and inter color bleeding properties, curl and cockling of the recording medium may get worse.

Here the "application ratio per unit area" above is the ratio of the application amount obtained of each of the liquids per unit area ($g/m^2$) when the single sided printing or double sided printing modes are selected for printing a pure solid color image.

The number of coarse particles $(P_{1-2})$ and the number of coarse particles $(P_{1-3})$ are both preferably about 5,000 to about 5,000,000 particles per a 1, more preferable about 6,000 to about 2,500,000 particles per μl, and still more preferably about 7,500 to about 1,500,000 particles per μl. If the number of coarse particles ($P_{1-2}$) and the number of coarse particles ($P_{1-3}$) are less than 5,000 particles per μl then optical density can decrease. Also, if the number of coarse particles ($P_{1-2}$) and the number of coarse particles ($P_{1-3}$) are more than 5,000,000 particles per μl then reliability elements, such as spray properties and nozzle blocking, may get worse.

The detail of the measuring method of the number of coarse particles ($P_{1-2}$) and the number of coarse particles ($P_{1-3}$) will be explained.

The number of coarse particles ($P_{1-2}$) and the number of coarse particles ($P_{1-3}$) are measured by mixing the first and second liquids, or first and third liquids, in a given ratio (the above application ratio), taking a 2 μl sample while stirring, and using an Accusizer TM770 Optical Particle Sizer (manufactured by Particle Sizing Systems). As the density of the dispersed particle parameter for the measurement, the density of the coloring material is entered. This coloring material density can be obtained by heating the coloring material dispersion liquid, and, by drying, measuring the obtained coloring material powder using a densitometer or a pycnometer.

The following method can be used to adjust the application ratio per unit area of the first and second liquids, or the first and third liquids in order to meet the above criteria.

For example, methods which can be used are: a) a method of adjusting the number of pixels of each of the first, second and third liquids; or, b) a method of adjusting the application amount per pixel for each of the first, second and third liquids. Also, when using the method of b) it is preferable that the way in which the application amount per pixel is controlled is by altering the wave form of the voltage applied to the liquid at the time of discharge.

In the inkjet recording method of the present invention, for printing of the same color, the application amount of liquid per pixel in the single sided printing mode is preferably substantially the same as or more than the application amount of liquid per pixel in the double sided printing mode. More preferably, the amount of the first liquid applied per pixel in the double sided printing mode compared to that in the single sided printing mode is about 0.1 to about 1; and more preferably about 0.7 to about 0.9.

Also, for printing of the same color, if the amount of the first liquid applied per pixel in the double sided printing mode is greater than the amount in the single sided printing mode, then dirty images, curl and cockling of the recording medium may occur.

By “printing of the same color” it is meant printing of color pixels such that the value of ΔE of the CIELAB color space is less than 3.

Here, in the present invention the amounts of the first liquid, the second liquid and the third liquid applied per pixel are preferably each about 0.01 ng to about 25 ng. The amount of the first liquid applied per pixel is more preferably about 0.1 ng to about 20 ng, and even more preferably about 0.5 ng to about 8 ng. The amounts of the second liquid applied per pixel and the amounts of the third liquid applied per pixel are more preferably about 0.1 ng to about 15 ng, and even more preferably about 0.5 ng to about 4 ng. When the amount of the first liquid applied per pixel and the amount of the second liquid applied per pixel are less than 0.01 ng then sufficient optical density may not be obtained. On the other hand when the amount of the first liquid applied per pixel and the amount of the second liquid applied per pixel is more than 25 ng, then bleeding may occur, and the drying time of the coloring material may be slowed. This development of bleeding changes with the incident angle of the first, second and third liquids to the recording medium which depends on the amount in a drop. As the amount per drop increases then so also may do a tendency that the drops are easily spread out in the direction of the surface of the paper.

In the present invention, one pixel, indicates the smallest unit into which the printed image can be broken down, and this mainly determines the resolution of the printing head and the resolution in the conveying direction of the recording medium. For this there is the first liquid gross amount, which is the application amount of the first liquid applied to form a pixel, second liquid gross amount, which is the application amount of the second liquid applied to form a pixel, and the third liquid gross amount, which is the application amount of the third liquid applied to form a pixel.

In the present invention in the single sided printing mode, the ratio by mass of the amount of the first liquid to the second liquid applied per pixel is preferably between about 100:5 and about 100:100; and more preferably between about 100:5 and about 100:50; and still more preferably between about 100:10 and about 100:20. If the ratio by mass of the application amount of the second liquid per pixel to the application amount of the first liquid per pixel is less than 5/100 then insufficient coagulation, a decline in optical density, worsening of bleeding and inter color bleeding may occur. On the other hand, if the ratio by mass of the application amount of the second liquid per pixel to the application amount of the first liquid per pixel is more than 100/100 then a worsening of curl and cockling of the recording medium may occur.

Also, in the double sided printing mode, the ratio by mass of the amount of the first liquid to the third liquid applied per pixel is preferably between about 100:1 and about 100:50; and more preferably between about 100:1 and about 100:25; and still more preferably between about 100:2 and about 100:15. If the ratio by mass of the application amount of the third liquid per pixel to the application amount of the first liquid per pixel is less than 1/100 then insufficient coagulation, a decline in optical density, worsening of bleeding and inter color bleeding may occur. On the other hand, if the ratio by mass of the application amount of the third liquid per pixel to the application amount of the first liquid per pixel is more than 25/100 then dirty images when high speed double sided printing may occur.

In the present invention it is preferable that mutual contact occurs on the surface of the recording medium between the first liquid and the second liquid, or the first liquid and the third liquid when respectively the first liquid and the second liquid, or the first liquid and the third liquid are applied. This is because by the mutual contact between the first liquid and the second liquid, or the first liquid and the third liquid, the liquids coagulate due to the action of the coagulant(s), the recording method becomes superior in optical density, bleeding and inter color bleeding properties, and drying times. As long as there is mutual contact then it does not matter if the application is mutually adjacent, or the application gives a covering, however application to give a covering is preferable.

Also, regarding the sequence of application (ejection) the first liquid is applied after application of the second or third liquids. This is because by applying the second and third liquids first, it is possible to effectively coagulated the constitutional components in the first liquid. As long as the first liquid is applied after the second liquid this can be done at any time. It is preferable to apply the first liquid 0.1 seconds or less after the application of the second and third liquids.

Regarding the type of inkjet recording method for the present invention it is preferable, from the perspectives of resulting improvement in the bleeding and inter color bleeding, to use thermal inkjet printing, or piezo inkjet printing methods. The reason for this is not clear but in the case of thermal inkjet printing, at the time of ejection heat is applied to the ink, and it becomes very low in viscosity. But since the temperature of the ink decreases on the surface of the recording medium, the viscosity rapidly increases. It can be supposed that bleeding and inter-color bleeding properties are improved as a result. Also in the case of piezo inkjet printing, it is possible to eject liquids of high viscosity, and by doing so the spreading out of the high viscosity liquids on the surface of the recording medium can be suppressed, presumably leading to the improvement in bleeding and inter color bleeding properties.

The detail of the ink set for use in the inkjet recording method of the present invention will now be explained.

The ink set of the inkjet recording method of the invention comprises: a first liquid containing at least a coloring material, a water soluble solvent and water; a second liquid and a third liquid each containing at least a coagulant, a water soluble solvent and water.

<First Liquid>

The first liquid of the invention has at least a coloring material and a water soluble solvent and water. Each of these components will be described.

<Coloring Material>

For the coloring material for use in the first liquid either a dye or a pigment can be used but the use of a pigment is preferable. This can be thought to be because coagulation occurs easier in the case of a pigment than a dye when mixed with the second liquid. Amongst pigments it is preferable that the pigment is: a pigment which is dispersed by the use of a polymer dispersing agent (referred to as a polymer substance later); a self dispersible pigment; a resin coated pigment; or a graft polymer pigment.

The pigment for use in the invention may be an organic pigment or an inorganic pigment. Examples of a black pigment include carbon black pigments such as furnace black, lamp black, acetylene black, and channel black. A black pigment, the pigments of the three primary colors of cyan, magenta and yellow, pigments of particular colors such as red, green, blue, brown and white, metallic pigments of gold or silver color, colorless or light-colored extender pigments, and/or a plastic pigments may be used in the invention. Also particles having a dye or a pigment fixed on the surface of a core of silica, alumina, or a polymer bead; insoluble lake dyes; colored emulsions; and/or colored latexes may be used as the pigment. Further, a new pigment synthesized for the invention may be used.

Specific examples of the black pigment used in the invention include, but are not limited to: Raven 7000, Raven 5750, Raven 5250, Raven 5000 ULTRA II, Raven 3500, Raven 2000, Raven 1500, Raven 1250, Raven 1200, Raven 1190 ULTRA II, Raven 1170, Raven 1255, Raven 1080, and Raven 1060 (available from Columbian Chemicals Company); Regal 400R, Regal 330R, Regal 660R, Mogul L, Black Pearls L, Monarch 700, Monarch 800, Monarch 880, Monarch 900, Monarch 1000, Monarch 1100, Monarch 1300, and Monarch 1400 (available from Cabot Corporation); Color Black FW1, Color Black FW2, Color Black FW2V, Color Black 18, Color Black FW200, Color Black S150, Color Black S160, Color Black S170, Printex 35, Printex U, Printex V, Printex 140U, Printex 140V, Special Black 6, Special Black 5, Special Black 4A, and Special Black 4 (available from Degussa AG); and, No. 25, No. 33, No. 40, No. 47, No. 52, No. 900, No. 2300, MCF-88, MA 600, MA 7, MA 8, and MA 100 (available from Mitsubishi Chemical Corporation).

Specific examples of the cyan pigment include, but are not limited to, C.I. Pigment Blue-1, -2, -3, -15, -15:1, -15:2, -15:3, -15:4, -16, -22, and -60.

Specific examples of the magenta pigment include, but are not limited to, C.I. Pigment Red-5, -7, -12, -48, -48:1, -57, -112, -122, -123, -146, -168, -184, and -202.

Specific examples of the yellow pigment include, but are not limited to, C.I. Pigment Yellow-1, -2, -3, -12, -13, -14, -16, -17, -73, -74, -75, -83, -93, -95, -97, -98, -114, -128, -129, -138, -151, -154, and -180.

The water-self-dispersible pigment used in the invention has many highly water-soluble groups on the surface thereof and can be stably dispersed in water without a polymer dispersing agent. Specifically, the water-self-dispersible pigment may be obtained by subjecting an ordinary pigment to surface modification such as acid/base treatment, coupling agent treatment, polymer grafting treatment, plasma treatment, and/or oxidation/reduction treatment.

Further, not only the above surface-modified pigment, but also a commercially available self-dispersible pigment such as Cab-o-jet-200, Cab-o-jet-250, Cab-o-jet-260, Cab-o-jet-270, Cab-o-jet-300, IJX-444, and/or IJX-55 available from Cabot Corporation and Microjet Black CW-1 and/or CW-2 available from Orient Chemical Industries, Ltd. may be used as the water-self-dispersible pigment.

It is preferable that as the self dispersible pigment has a surface which comprises a functional group which is a carboxylic acid group. This is thought to be because the degree of dissociation of a carboxylic acid group is small, making it easy to obtain sufficient coagulation.

Also, when the surface of the coloring material used in the first liquid has a sulfonic acid group then it is preferable that this coloring material is used together with a carboxylic acid group containing polymer compound. Because coloring materials with a sulfonic group on the surface are hard to coagulate improvements in the optical density, bleeding and inter color bleeding properties sometimes may not be achieved. However, if such a coloring material is used together with a carboxylic acid group containing polymer compound then when the first liquid and the second liquid are mixed, insolubilization of the carboxylic acid group containing polymer compound occurs. It is supposed that, at this time, because the coloring material becomes incorporated in and coagulated with polymer compound the optical density, bleeding and inter color bleeding properties are improved.

A pigment coated with a resin may be used as the coloring material of the first liquid. Such a pigment is referred to as a micro-encapsulated pigment, and may not only be a commercial micro-encapsulated pigment such as those available from Dainippon Ink and Chemicals, Inc., or Toyo Ink Manufacturing Co., Ltd., but also may be a micro-encapsulated pigment developed for the invention.

Further, the pigment which is used as the coloring material of the first liquid may be a graft polymer pigment. Such a graft polymer pigment is a pigment in which an organic compound, such as a polymer, chemically bonds to the surface of a pigment.

The dye for use in the invention may be a water-soluble dye or a dispersible dye.

Specific examples of the water-soluble dye include C.I. Direct Black-2, -4, -9, -11, -17, -19, -22, -32, -80, -151, -154, -168, -171, -194, and -195, C.I. Direct Blue-1, -2, -6, -8, -22, -34, -70, -71, -76, -78, -86, -112, -142, -165, -199, -200, -201, -202, -203, -207, -218, -236, -287, and -307, C.I. Direct Red-1, -2, -4, -8, -9, -11, -13, -15, -20, -28, -31, -33, -37, -39, -51, -59, -62, -63, -73, -75, -80, -81, -83, -87, -90, -94, -95, -99, -101, -110, -189, and -227, C.I. Direct Yellow-1, -2, -4, -8, -11, -12, -26, -27, -28, -33, -34, -41, -44, -48, -58, -86, -87, -88, -132, -135, -142, -144, and -173, C.I. Food Black-1 and -2, C.I. Acid Black-1, -2, -7, -16, -24, -26, -28, -31, -48, -52, -63, -107, -112, -118, -119, -121, -156, -172, -194, and -208, C.I. Acid Blue-1, -7, -9, -15, -22, -23, -27, -29, -40, -43, -55, -59, -62, -78, -80, -81, -83, -90, -102, -104, -111, -185, -249, and -254, C.I. Acid Red-1, -4, -8, -13, -14, -15, -18, -21, -26, -35, -37, -52, -110, -144, -180, -249, -257, and -289, and C.I. Acid Yellow-1, -3, -4, -7, -11, -12, -13, -14, -18, -19, -23, -25, -34, -38, -41, -42, -44, -53, -55, -61, -71, -76, -78, -79, and -122.

Specific examples of the dispersible dye include C.I. Disperse Yellow-3, -5, -7, -8, -42, -54, -64, -79, -82, -83, -93, -100, -119, -122, -126, -160, -184:1, -186, -198, -204, and -224, C.I. Disperse Orange-13, -29, -31:1, -33, -49, -54, -66, -73, -119, and -163, C.I. Disperse Red-1, -4, -11, -17, -19, -54; -60, -72, -73, -86, -92, -93, -126, -127, -135, -145, -154, -164, -167:1, -177, -181, -207, -239, -240, -258, -278, -283, -311, -343, -348, -356, and -362, C.I. Disperse Violet-33, C.I. Disperse Blue-14, -26, -56, -60, -73, -87, -128, -143, -154, -165, -165:1, -176, -183, -185, -201, -214, -224, -257, -287, -354, -365, and -368, and C.I. Disperse Green-6:1 and -9.

The coloring material of the first liquid preferably has a volume average particle size of about 30 nm to 250 nm. The volume average particle size of the coloring material means: the particle size of the coloring material itself; or, if the coloring material is attached to an additive such as a dispersing agent, then the size of the particle of coloring material in the additive attached state. In the present invention the measuring instrument for the volume average particle size used is a Microtrac UPA Ultrafine Particle Analyser (manufactured by Leeds and Northrup). Specifically, the measurement is carried out according to the prescribed method and using 4 ml of the first liquid (ink) being put in the measuring cell. As the input parameters, at the time of determination, for the viscosity the viscosity of the first liquid (ink) is input, and for the density the particle dispersion the density of the pigment (coloring material density) is input.

More preferably the volume average particle size is about 50 nm to 200 nm, and even more preferable is a volume average particle size of about 75 nm to 175 nm. The if the volume average particle size is less than 30 nm then there are cases when the optical density becomes low, and if the volume average particle size is more than 250 nm then sometimes it is not possible to assure the stability.

The amount of coloring material of the present invention used in the first liquid is preferably in the range of about 0.1% by mass to about 20% by mass, and more preferably in the range of about 1% by mass to about 10% by mass. If the amount of coloring material used in the first liquid is less than 0.1% by mass then it may not be possible to achieve sufficient optical density, whereas if the amount of coloring material used in the first liquid is more than 20% by mass then ejection characteristics of the first liquid may become unstable.

<Polymer Substance>

In order to disperse the above coloring material in the first liquid of the invention, or as a coagulation accelerator, it is preferable to use a polymer substance.

In the invention, a polymer substance used to disperse the coloring material (pigment) is called a polymer dispersing agent.

As the polymer substance can be used water soluble polymer substances, or water insoluble polymer substances such as emulsions, and self dispersing particles. Also non-ionic compounds, anionic compounds, cationic compounds and amphoteric compounds can all be used.

It is supposed that the improvement effect on the optical density, bleeding and inter color bleeding properties is due to the incorporation of the coloring material in the polymer substance in the first liquid during coagulation. The coagulation of the polymer substance is as a result of an increase in viscosity or coagulation effect of the coagulant contained in the second and third liquids. In other words, the size, and density of the structural body of the polymer substance at the time of coagulation, and the ease in which the coloring material can be incorporated within the polymer substance and the like are important for the speed of coagulation. The coloring material for the first liquid and the coagulant for the second or third liquid are chosen to make the most appropriate combination in order to generate the improvement in the optical density, bleeding and inter color bleeding properties.

In the invention it is preferable for the polymer compound to use a compound which includes a carboxylic acid group(s). This is supposed to be because the degree of dissociation of carboxylic acid is low, and so the coagulant accelerates coagulation.

Specific examples of the polymer substance include copolymers of monomers having an α,β-ethylenic unsaturated group. Examples of the monomers having an α,β-ethylenic unsaturated group include acrylic acid, methacrylic acid, crotonic acid, itaconic acid, itaconic acid monoesters, maleic acid, maleic acid monoesters, fumaric acid, fumaric acid monoesters, vinylsulfonic acid, styrene sulfonic acid, sulfonated vinylnaphthalene, vinyl alcohol, acrylamide, methacryloxyethyl phosphate, bismethacryloxyethyl phosphate, methacryloxyethylphenyl acid phosphate, ethylene glycol dimethacrylate, diethylene glycol dimethacrylate, styrene, styrene derivatives such as α-methylstyrene and vinyltoluene, vinylcyclohexane, vinylnaphthalene, vinylnaphthalene derivatives, alkyl acrylates, phenyl acrylate, alkyl methacrylates, phenyl methacrylate, cycloalkyl methacrylates, alkyl crotonates, dialkyl itaconates, and dialkyl maleates.

Single polymers using the above monomers having an α,β-ethylenic unsaturated group, and copolymers produced by copolymerizing one or more of the above monomers having an α,β-ethylenic unsaturated group can be preferably used as the polymer substance in the invention. Specific examples of such a copolymer include styrene-styrenesulfonic acid copolymers, styrene-maleic acid copolymers, styrene-methacrylic acid copolymers, styrene-acrylic acid copolymers, vinylnaphthalene-maleic acid copolymers, vinylnaphthalene-methacrylic acid copolymers, vinylnaphthalene-acrylic acid copolymers, alkyl acrylate-acrylic acid copolymers, alkyl methacrylate-methacrylic acid copolymers, styrene-alkyl methacrylate-methacrylic acid terpolymers, styrene-alkyl acrylate-acrylic acid terpolymers, styrene-phenyl methacrylate-methacrylic acid terpolymers, and styrene-cyclohexyl methacrylate-methacrylic acid terpolymers.

The polymer substance is preferably selected on the basis of the acid value in consideration of the affinity between the polymer and the coloring material (pigment), and/or the coagulation properties of the polymer substance itself. Specifically, the polymer preferably has: an acid value of about 30 KOHmg/g to about 150 KOHmg/g; or an acid value of about 150 KOHmg/g to 1000 KOHmg/g with a neutralization degree of about 20% or more and about 80% or less.

When the polymer has an acid value of 30 KOHmg/g to 150 KOHmg/g, the acid value is more preferably about 50 to about 120 KOHmg/g, and still more preferably about 70 to about 120 KOHmg/g. When the acid value is less than 30 KOHmg/g, ejection (discharge) stability of the first liquid may deteriorate.

When the polymer has an acid value of about 150 KOHmg/g to 1000 KOHmg/g and a neutralization degree of about 20% or more and about 80% or less, the polymer more preferably has an acid value of about 200 to about 400 KOHmg/g and a neutralization degree of about 50 to about 80%, and still more preferably has an acid value of about 200 to about 300 KOHmg/g and a neutralization degree of about 60 to about 80%. When the acid value is more than 1,000 KOHmg/g and the neutralization degree is less than 20% or more than 80%, the ink has a high viscosity and cannot be normally ejected out in some cases.

The advantage of use of a polymer having a low acid value, or a high acid value and a low neutralization degree is thought to be as follows. The number of water-soluble groups of the polymer can be reduced, and, even when a coagulating agent having weak cohesion is contained in the second or third liquids, sufficient cohesion can be achieved.

The weight-average molecular weight of the polymer is preferably about 2,000 to about 1,000,000, and more preferably about 3,500 to about 50,000. When the weight-average molecular weight of the polymer is less than 2,000 the pigment may be unstably dispersed. On the other hand, when the weight-average molecular weight is more than 1,000,000, the viscosity of the ink becomes high and ejecting properties of the ink may deteriorate.

The mass ratio of the polymer added to the total mass of the first liquid is preferably about 0.01 to about 10% by mass, more preferably about 0.05 to about 7.5% by mass, and still more preferably about 0.1 to about 5% by mass. When the added amount is more than 10% by mass, the viscosity of the ink becomes high and the ejecting properties of the ink may deteriorate. On the other hand, when the added amount is less than 0.01% by mass, dispersion stability of the pigment may decrease.

(Water-Soluble Solvent)

The water-soluble solvent for use in the first liquid may be any solvent as long as it has a solubility of about 0.1% or more in water. Specifically, the water-soluble solvent may be a polyhydric alcohol, a polyhydric alcohol derivative, a nitrogen-containing solvent, an alcohol, and/or a sulfur-containing solvent.

Specific examples of the polyhydric alcohol include ethylene glycol, diethylene glycol, propylene glycol, butylene glycol, triethylene glycol, 1,5-pentanediol, 1,2,6-hexanetriol, and glycerin.

Specific examples of the polyhydric alcohol derivative include ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, propylene glycol monobutyl ether, dipropylene glycol monobutyl ether, and an adduct of diglycerin and ethylene oxide.

Specific examples of the nitrogen-containing solvent include pyrrolidone, N-methyl-2-pyrrolidone, cyclohexylpyrrolidone, and triethanolamine.

Specific examples of the alcohol include ethanol, isopropyl alcohol, butyl alcohol, and benzyl alcohol.

Specific examples of the sulfur-containing solvent include thiodiethanol, thiodiglycerol, sulfolane, and dimethyl sulfoxide.

Further, the water-soluble solvent may be propylene carbonate, and/or ethylene carbonate.

One of these water-soluble solvents may be used singly, or two or more of them may be used together.

The mass ratio of the water-soluble solvent to the total mass of the first liquid is preferably about 1 to about 60% by mass, and more preferably about 5 to about 40% by mass. When the mass ratio is less than 1% by mass, sufficient optical density may not be obtained. On the other hand, the mass ratio is more than 60% by mass, the viscosity of the ink becomes high and ejecting stability thereof deteriorates in some cases.

(Preferable Physical Properties of the First Liquid)

The surface tension of the first liquid is preferably from about 20 mN/m to about 60 mN/m, more preferably about 20 mN/m to about 45 mN/m and still more preferably about 25 mN/m to about 35 mN/m. When the surface tension is less than 20 mN/m then liquid may sometimes flow out onto the nozzle surface, and normal printing may not be carried out. On the other hand, if the surface tension of the first liquid is more than 60 mN/m then sometimes permeability may get slow, and drying time may get slow.

The viscosity of the first liquid is preferably from about 1.2 mPa·s to about 8.0 mPa·s, more preferably from about 1.5 mPa·s to about 6.0 mPa·s, and still more preferably from about 1.8 mPa·s to about 4.5 mPa·s. If the viscosity of the first liquid is greater than 8.0 mPa·s then the ability to discharge may reduce. On the other hand, if less than 1.2 mPa·s then stability may deteriorate for continuous ejecting.

(Water)

In order for the surface tension and the viscosity of the first liquid of the invention to be within the above ranges water is added. The amount of water added is not particularly limited but is preferably, relative to the total mass of the first liquid, about 10% to about 99%, more preferably about 30% to about 80%.

<Second and Third Liquids>

Each of the second and third liquids of the invention comprise at least a coagulant, a water soluble solvent and water. Details of each of the components will be explained.

(Coagulant)

The coagulant used in this invention indicates a substance which has the effect that, by the reaction with the components of the first liquid, or by the interaction thereof, raises the viscosity or initiates coagulation. Specifically inorganic electrolytes, organic amine compounds and organic acids can be effectively used.

It is preferable that the coagulants of the second and third liquids are different from each other.

The inorganic electrolyte may be a salt of a metal ion and an acid. Examples of the metal ion include alkaline metal ions such as a lithium ion, a sodium ion, and a potassium ion; and polyvalent metal ions such as an aluminum ion, a barium ion, a calcium ion, a copper ion, an iron ion, a magnesium ion, a manganese ion, a nickel ion, a tin ion, a titanium ion, and a zinc ion. Examples of the acid include hydrochloric acid, hydrobromic acid, hydroiodic acid, sulfuric acid, nitric acid, phosphoric acid, thiocyanic acid, organic carboxylic acids such as acetic acid, oxalic acid, lactic acid, fumaric acid, citric acid, salicylic acid, and benzoic acid, and organic sulfonic acids.

Specific examples of the inorganic electrolyte include: alkaline metal salts such as lithium chloride, sodium chloride, potassium chloride, sodium bromide, potassium bromide, sodium iodide, potassium iodide, sodium sulfate, potassium nitrate, sodium acetate, potassium oxalate, sodium citrate, and potassium benzoate; and polyvalent metal salts such as aluminum chloride, aluminum bromide, aluminum sulfate, aluminum nitrate, sodium aluminum sulfate, potassium aluminum sulfate, aluminum acetate, barium chloride, barium bromide, barium iodide, barium oxide, barium nitrate, barium thiocyanate, calcium chloride, calcium bromide, calcium iodide, calcium nitrite, calcium nitrate, calcium dihydrogen phosphate, calcium thiocyanate, calcium benzoate, calcium acetate, calcium salicylate, calcium tartrate, calcium lactate, calcium fumarate, calcium citrate, copper chloride, copper bromide, copper sulfate, copper nitrate, copper acetate, iron chloride, iron bromide, iron iodide, iron sulfate, iron nitrate, iron oxalate, iron lactate, iron fumarate, iron citrate, magnesium chloride, magnesium bromide, magnesium iodide, magnesium sulfate, magnesium nitrate, magnesium acetate, magnesium lactate, manganese chloride, manganese sulfate, manganese nitrate, manganese dihydrogen phosphate, manganese acetate, manganese salicylate, manganese benzoate, manganese lactate, nickel chloride, nickel bromide, nickel sulfate, nickel nitrate, nickel acetate, tin sulfate, titanium chloride, zinc chloride, zinc bromide, zinc sulfate, zinc nitrate, zinc thiocyanate, and zinc acetate.

The organic amine compound may be a primary, secondary, tertiary, or quaternary amine, or a salt thereof.

Specific examples of the organic amine compound include tetraalkylammonium salts, alkylamine salts, benzalconium salts, alkylpyridium salts, imidazolium salts, and polyamine salts, such as isopropylamine, isobutylamine, t-butylamine, 2-ethylhexylamine, nonylamine, dipropylamine, diethylamine, trimethylamine, triethylamine, dimethylpropylamine, ethylenediamine, propylenediamine, hexamethylenediamine, diethylenetriamine, tetraethylenepentamine, diethanolamine, diethylethanolamine, triethanolamine, tetramethylammonium chloride, tetraethylammonium bromide, dihydroxyethylstearylamine, 2-heptadecenyl-hydroxyethylimidazoline, lauryl dimethyl benzyl ammonium chloride, cetylpyridinium chloride, stearamidemethylpyridium chloride, diallyl dimethyl ammonium chloride polymers, diallylamine polymers, monoallylamine polymers, onium salts thereof including sulfonium salts and phosphonium salts thereof, and phosphate esters thereof.

Specific examples of the organic acid compound include: 2-pyrrolidone-5-carboxylic acid, 4-methyl-4-pentanolide-3-carboxylic acid, furancarboxylic acid, 2-benzofurancarboxylic acid, 5-methyl-2-furancarboxylic acid, 2,5-dimethyl-3-furancarboxylic acid, 2,5-furandicarboxylic acid, 4-butanolide-3-carboxylic acid, 3-hydroxy-4-pyrone-2,6-dicarboxylic acid, 2-pyrone-6-carboxylic acid, 4-pyrone-2-carboxylic acid, 5-hydroxy-4-pyrone-5-carboxylic acid, 4-pyrone-2,6-dicarboxylic acid, 3-hydroxy-4-pyrone-2,6-dicarboxylic acid, thiophenecarboxylic acid, 2-pyrrolecarboxylic acid, 2,3-dimethylpyrrole-4-carboxylic acid, 2,4,5-trimethylpyrrole-3-propionic acid, 3-hydroxy-2-indolecarboxylic acid, 2,5-dioxo-4-methyl-3-pyrroline-3-propionic acid, 2-pyrrolidinecarboxylic acid, 4-hydroxyproline, 1-methylpyrrolidine-2-carboxylic acid, 5-carboxy-1-methylpyrrolidine-2-acetic acid, 2-pyridinecarboxylic acid, 3-pyridinecarboxylic acid, 4-pyridinecarboxylic acid, pyridinedicarboxylic acid, pyridinetricarboxylic acid, pyridinepentacarboxylic acid, 1,2,5,6-tetrahydro-1-methylnicotinic acid, 2-quinolinecarboxylic acid, 4-quinolinecarboxylic acid, 2-phenyl-4-quinolinecarboxylic acid, 4-hydroxy-2-quinolinecarboxylic acid, and 6-methoxy-4-quinolinecarboxylic acid, potassium hydrogen phthalate, sodium citrate, potassium citrate, tartaric acid, lactic acid, and compounds of derivatives thereof and compounds of salts thereof.

Amongst these coagulants magnesium chloride, magnesium bromide, magnesium iodide, magnesium sulfate, magnesium nitrate, magnesium acetate, calcium chloride, calcium bromide, calcium nitrate, calcium dihydrogen phosphate, calcium benzoate, calcium acetate, calcium tartrate, calcium lactate, calcium fumarate, calcium citrate, diallyl dimethyl ammonium chloride polymers, diallylamine polymers, monoallylamine polymers, pyrrolidonecarboxylic acid, pyronecarboxylic acid, pyrrolecarboxylic acid, furancarboxylic acid, pyridinecarboxylic acid, coumaric acid, thiophenecarboxylic acid, nicotinic acid, potassium dihydrogen citrate, succinic acid, tartaric acid, lactic acid, and potassium hydrogen phthalate, and derivatives and salts thereof are preferred. Magnesium chloride, magnesium nitrate, calcium nitrate, diallylamine polymers, pyrrolidonecarboxylic acid, pyronecarboxylic acid, furancarboxylic acid, and coumaric acid, and derivatives and salts thereof are more preferred.

In the invention, one coagulating agent may be used singly, or two or more coagulating agents may be used together.

The mass ratio of the quantity of the coagulating agent(s) added to the total mass of the second liquid and to the third liquid are preferably about 0.01 to about 30% by mass, more preferably about 0.1 to about 15% by mass, and still more preferably about 0.25 to about 10% by mass. When the amount of the coagulant added to the second or third liquid is less than 0.01% by mass, at the time of contact with the first liquid the coagulation caused by the coagulating agent may become insufficient, thereby deteriorating optical density, bleeding, and inter color bleeding. On the other hand, when the amount added is more than 30% by mass, ejecting properties of the liquid composition may deteriorate and the liquid composition cannot be normally ejected out in some cases.

(Water-soluble Solvent)

The second and third liquids may contain the same water-soluble solvents as used in the first liquid.

The mass ratio of the water-soluble solvent to the total mass of the total liquid is preferably about 1 to about 60% by mass, and more preferably about 5 to about 40% by mass. When the water soluble solvent amount is less than 1% by mass, sufficient optical density may not be obtained. On the other hand, when the mass ratio is more than 60% by mass, the viscosity of the liquid composition becomes high and ejecting property of the liquid composition may deteriorate.

(Preferred Physical Properties of the Second and Third Liquids)

The surface tension of the second and third liquids are preferably about 20 to about 45 mN/m, more preferably about 20 to about 39 mN/m, and still more preferably about 25 to about 35 mN/m. When the surface tension is less than 20 mN/m, the liquid composition may flow out onto the nozzle surface and normal printing can sometimes not be achieved. On the other hand, when the surface tension is more than 45 mN/m, penetration of the ink into paper may deteriorate, and drying time may lengthen.

The viscosity of the second and third liquids are preferably about 1.2 to about 8.0 mPa·s, more preferably about 1.5 mPa·s to 6.0 mPa·s, and still more preferably about 1.8 mPa·s to 4.5 mPa·s. When the viscosity of the second and third liquids is higher than 8.0 mPa·s, ejecting properties may deteriorate. On the other hand, when the viscosity is less than 1.2 mPa·s, stability may deteriorate for continuous ejecting.

(Water)

In order for the surface tension and the viscosity of the second and third liquids of the invention to be within the above ranges water is added. The amount of water added is not particularly limited but is preferably, relative to the total mass of the liquid, about 10% to about 99%, and more preferably about 30% to about 80%.

(Coloring Material)

The second and/or third liquids may contain coloring materials, as appropriate. The coloring materials in the second and third liquids may be selected from those described in the explanations for the coloring materials of the first liquid. The coloring materials of the second and third liquids are preferably a dye, a pigment having a sulfonic acid group or a sulfonate salt group on the surface thereof, an anionic self dispersible pigment, and/or a cationic self-dispersible pigment. The reason for this is thought to be that they do not coagulate easily under acidic conditions and so can improve storage stability of the second and third liquid.

(Other Additives for the First, Second and Third Liquids)

Additives which can be used in the first, second and/or third liquids, as appropriate, will be described below.

A surfactant may be contained in the first, second and/or third liquids. A compound having a hydrophilic moiety and a hydrophobic moiety within the molecule thereof can be effectively used as the surfactant in the invention. The surfactant may be an anionic surfactant, a cationic surfactant, an amphoteric surfactant, and/or a nonionic surfactant. Further, the above polymer substance (the polymer dispersing agent) may be used as the surfactant.

Examples of the anionic surfactant include alkylbenzene sulfonates, alkylphenyl sulfonates, alkylnaphthalene sulfonates, higher fatty acid salts, sulfates of higher fatty acid esters, sulfonates of higher fatty acid esters, sulfates and sulfonates of higher alcohol ethers, higher alkylsulfosuccinates, higher alkylphosphates, and phosphates of adducts of higher alcohol and ethylene oxide. Specific examples of effective anionic surfactants include dodecylbenzene sulfonate, kerylbenzene sulfonate, isopropylnaphthalene sulfonate, monobutylphenylphenol monosulfonate, monobutylbiphenyl sulfonate, and dibutylphenylphenol disulfonate.

Specific examples of the nonionic surfactant include polypropylene glycol-ethylene oxide adducts, polyoxyethylene nonylphenyl ether, polyoxyethylene octylphenyl ether, polyoxyethylene dodecylphenyl ether, polyoxyethylene alkyl ethers, polyoxyethylene fatty acid esters, sorbitan fatty acid esters, polyoxyethylene sorbitan fatty acid esters, fatty acid alkylolamides, acetylene glycol, acetylene glycol-oxyethylene adducts, aliphatic alkanolamides, glycerin esters, and sorbitan esters.

Examples of the cationic surfactant include tetraalkylammonium salts, alkylamine salts, benzalconium salts, alkylpyridium salts, and imidazolium salts. Specific examples thereof include dihydroxyethylstearylamine, 2-heptadecenyl-hydroxyethylimidazoline, lauryl dimethyl benzyl ammonium chloride, cetylpyridinium chloride, and stearamidemethylpyridium chloride.

Further, spiclisporic acid, and/or biosurfactants such as rhamnolipid and lysolecithin may also be used as the surfactant in the invention.

The content of the surfactant in each of the first, second and third liquids is preferably less than 10% by mass, more preferably about 0.01 to about 5% by mass, and still more preferably about 0.01 to about 3% by mass. When the surfactant content is 10% by mass or more, optical density and storage stability of a pigment ink may deteriorate.

Further, to control the characteristics of the first, second and third liquids, such as improving ejecting properties, the following additives to the first, second and third liquids can be used: polyethyleneimine, polyamine, polyvinylpyrrolidone, polyethylene glycol, a cellulose derivative such as ethylcellulose and/or carboxymethylcellulose, a polysaccharide and/or a derivative thereof, a water-soluble polymer, a polymer emulsion such as an acrylic polymer emulsion, a polyurethane emulsion, and/or a hydrophilic latex, a hydrophilic polymer gel, a cyclodextrin, a macrocyclic amine, a dendrimer, a crown ether, urea or a derivative thereof, acetamide, a silicone surfactant, and/or a fluorinated surfactant.

Further, so as to control conductivities and pH values thereof, the first, second and/or third liquid compositions may have been added an alkaline metal compound such as potassium hydroxide, sodium hydroxide, and/or lithium hydroxide, a nitrogen-containing compound such as ammonium hydroxide, triethanolamine, diethanolamine, ethanolamine, and/or 2-amino-2-methyl-1-propanol, an alkaline earth metal compound such as calcium hydroxide, an acid such as sulfuric acid, hydrochloric acid, and/or nitric acid, and/or a salt of a strong acid and a weak alkali such as ammonium sulfate.

The first, second and third liquids of the invention may of course be used in an ordinary inkjet recording apparatus, or also in one with a recording apparatus with such as a heater mounted for controlling the ink drying time. Or it can be used in a intermediate transfer type copying apparatus, where there is transfer to a recording medium such as paper after printing with recording materials on an intermediate body.

Further still, the second and third liquids can be used with a method which is not inkjet, such as a liquid coating roller and the like.

<<Inkjet Recording Apparatus>>

The present invention is an inkjet recording apparatus provided with a recording head which prints out by ejecting onto a recording medium an ink set for inkjet use, wherein the ink set comprises at least: a first liquid containing at least a coloring material, a water soluble solvent and water; second and third liquids each containing at least a coagulant, a water soluble solvent and water. Wherein, (A) printing modes comprise a single sided printing mode and a double sided printing mode, (B) when the single sided printing mode is selected printing is carried out by ejecting the first liquid and the second liquid, (C) when the double sided printing mode is selected printing is carried out by ejecting the first liquid and the third liquid, (D) the relationship $0.01<(P_{1-3})/(P_{1-2})<1$ is substantially satisfied where $(P_{1-2})$ represents the number of coarse particles of size 1 μm or larger of a mixed liquid, mixed in the application ratio per unit of surface area when the single sided printing is selected, of the first liquid and the second liquid, and where $(P_{1-3})$ represents the number of coarse particles of size 1 μm or larger of the mixed liquid, mixed in the application ratio per unit of surface area when the double sided printing is selected, of the first liquid and the third liquid.

In the inkjet printing apparatus of the invention, the value of $(P_{1-3})/(P_{1-2})$ is preferably about 0.1 to about 1.0, and more preferably about 0.75 to about 0.90.

If the value of$(P_{1-3})/(P_{1-2})$ is over 1 then the drying time of the coloring material lengthens, and dirty images can develop. On the other hand, if the value of $(P_{1-3})/(P_{1-2})$ is less than 0.01 then there can be a problem in achieving sufficient optical density.

In order to determine the number of coarse particles of $(P_{1-2})$, and the number of coarse particles of $(P_{1-3})$: the methods of obtaining the application ratios of the first liquid and the second liquid per unit of surface area with single sided printing, and the application ratios of the of the first liquid and the third liquid per unit of surface area with double sided printing are the same as in the inkjet recording method above.

Here the number of coarse particles $(P_{1-2})$ and the number of coarse particles $(P_{1-3})$ are both preferably about 5,000 to about 5,000,000 particles per it 1, more preferable about 6,000 to about 2,500,000 particles per µl, and still more preferably about 7,500 to about 1,500,000 particles per µl. If the number of coarse particles $(P_{1-2})$ and the number of coarse particles $(P_{1-3})$ are less than 5,000 particles per µl then optical density can decrease. Also, if the number of coarse particles $(P_{1-2})$ and the number of coarse particles $(P_{1-3})$ are more than 5,000,000 particles per µl then reliability elements, such as spray properties and nozzle blocking, may get worse.

The following method can be used to adjust the application ratio per unit area of the first and second liquids, or the first and third liquids to meet the above criteria.

For example, methods which can be used are: a) a method of adjusting the number of pixels of each of the first, second and third liquids; or, b) a method of adjusting the application amount per pixel for each of the first, second and third liquids. Also, when using the method of b) it is preferable that the way in which the application amount per pixel is controlled is by altering the wave form of the voltage applied to the liquid at the time of discharge.

In the inkjet recording apparatus of the present invention, for printing of the same color, the application amount of liquid per pixel in the single sided printing mode is preferably substantially the same as or more than the application amount of liquid per pixel in the double sided printing mode. More preferably, the amount of the first liquid applied per pixel in the double sided printing mode compared to that in the single sided printing mode is about 0.1 to about 1; and more preferably about 0.7 to about 0.9.

Also, for printing of the same color, if the amount of the first liquid applied per pixel in the double sided printing mode is greater than the amount in the single sided printing mode, then dirty images, curl and cockling of the recording medium may occur.

By printing of the same color is meant printing of color pixels such that the value of ΔE of the CIELAB color space is less than 3.

Details of preferred embodiments of the inkjet recording apparatus of the invention (referred to sometimes below simply as the recording apparatus) will now be described with reference to the drawings, however, the invention is not limited to these embodiments.

Figure 2:
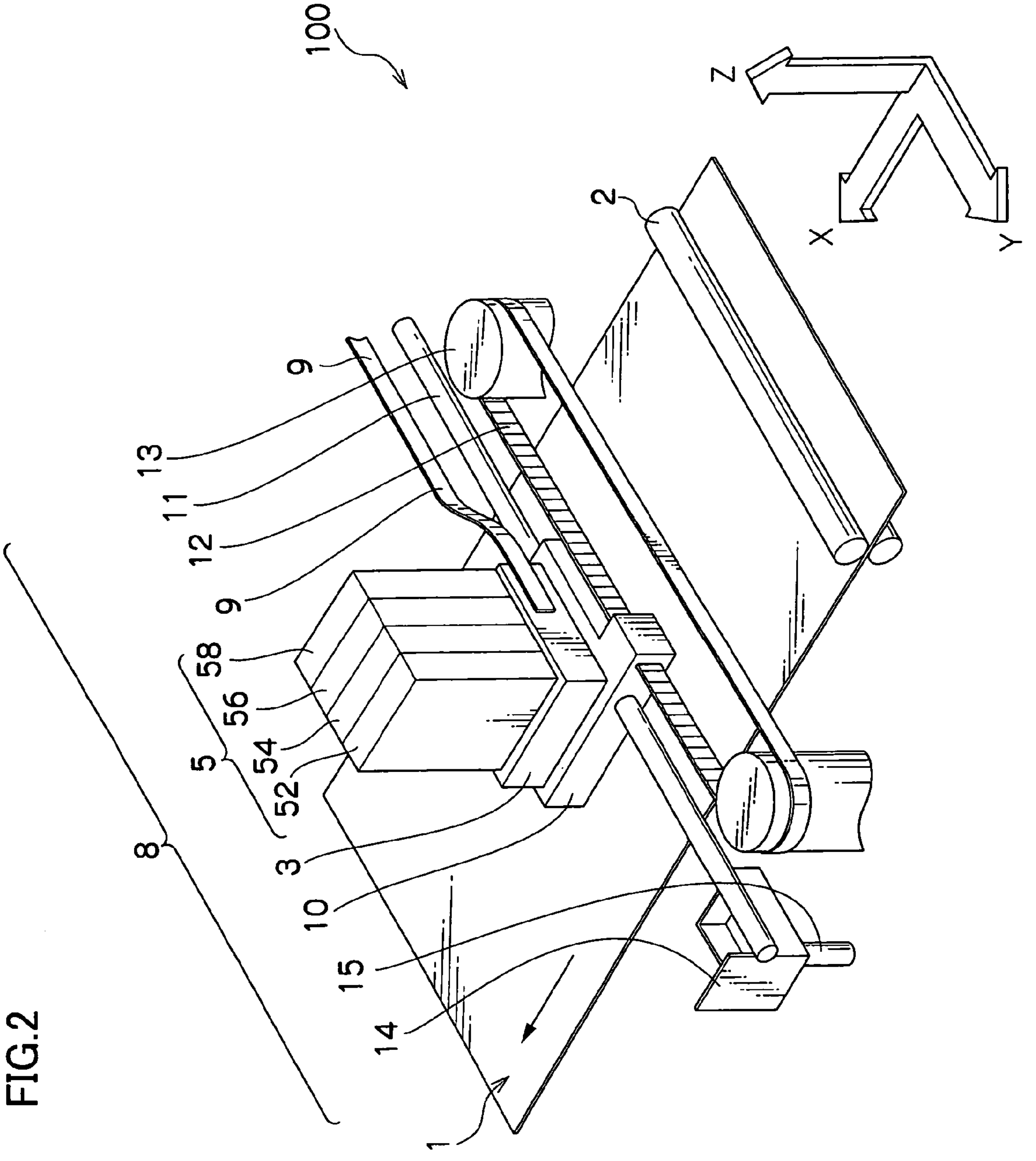
FIG. 2 is a perspective view showing the main internal parts of the inkjet recording apparatus of the present invention from FIG. 1.

FIG. 1 is a perspective view of the external construction of a preferred embodiment of the inkjet recording apparatus of the present invention. FIG. 2 is a perspective view showing the main internal parts of the inkjet recording apparatus of the present invention from FIG. 1.

The recording apparatus 100 of the invention is constructed to operate according to the above inkjet recording method of the invention, to form images (carry out printing).

In other words, as shown in FIGS. 1 and 2, recording apparatus 100 is in the main made up of: an external cover 6; a tray 7, capable of holding a prescribed capacity of recording medium 1, such as plain paper or the like; feeding roller 2 (conveying means), for feeding the recording medium 1 into the recording apparatus 100 one sheet at a time; and an image forming part 8 (image forming means) for printing by discharging onto a surface of recording medium 1 the first liquid (ink) and the second and third liquids (liquid compositions).

The feeding rollers 2 are a pair of rollers rotatably disposed in the recording apparatus 100. The feeding rollers 2 sandwich a recording medium 1 placed on the tray 7, and feed the recording medium 1 into the inside of the recording apparatus 100 one by one at a predetermined timing.

The image forming unit 8 ejects the first, second and the third liquids onto the recording medium 1 to form an image. The image forming unit 8 mainly has a recording head 3, an ink tank 5, an electrical signal feeding cable 9, a carriage 10, a guide rod 11, a timing belt 12, driving pulleys 13, and a maintenance unit 14.

In this embodiment, the ink tank 5 has plural tanks 52, 54, 56 and 58, in which inks of different colors corresponding to the first liquid and the second and third liquids composition are stored ejectably.

Further, as shown in FIG. 2, the recording head 3 is electrically connected to the electrical signal feeding cable 9 and the ink tank 5. When printing information (image recording information) is input from the outside to the recording head 3 through the electrical signal feeding cable 9, the recording head 3 sucks predetermined amounts of the inks from each of the ink tanks on the basis of the information, and ejects the inks onto the recording medium. The electrical signal feeding cable 9 supplies not only the printing information, but also electric power for driving the recording head 3.

The recording head 3 is disposed and fixed on the carriage 10, and the carriage 10 is connected to the guide rod 11 and the timing belt 12 wound around the driving pulleys 13. Thus, the recording head 3 can be moved parallel to the recording medium 1 along the guide rod 11 in the direction Y (main scanning direction) perpendicular to the recording medium feeding direction X (sub scanning direction).

The recording apparatus 100 is equipped with a control device (not shown) for controlling driving timing of the recording head 3 and that of the carriage 10 on the basis of the image recording information. Thereby, an image corresponding to the image recording information can be continuously formed on a predetermined region of a recording medium 1 fed in the feeding direction X at a predetermined speed.

The maintenance unit 14 is connected to a decompression device via a tube 15, and further connected to nozzles of the recording head 3. The internal pressure of each nozzle is reduced by a vacuum pump (not shown) disposed in a connection portion, whereby ink is aspirated from each nozzle.

By provision of the maintenance unit 14, obstructive ink adhered to the nozzles as the recording apparatus 100 is being driven can be removed when required, and vaporization of the ink from the nozzles can be prevented when the recording apparatus 100 is being stopped, if necessary. Since the coagulate is formed at the time that the first and second liquids or the first and third liquids are mixed, the maintenance unit 14 preferably has a structure in which the first and second liquids ink and the first and third liquids are separately stored.

In the invention, the recording head 3 preferably implements a thermal ink jet recording method or a piezo ink jet recording method.

The recording head 3 used here is the device which can control the amount of the application per one pixel of the first liquid, the second liquid, and/or the third liquid.

Here, in the present invention the amounts of the first liquid, the second liquid and the third liquid applied per pixel are preferably each about 0.01 ng to about 25 ng. The amount of the first liquid applied per pixel is more preferably about 0.1 ng to about 20 ng, and even more preferably about 0.5 ng to about 8 ng. The amounts of the second liquid applied per pixel and the amounts of the third liquid applied per pixel are more preferably about 0.1 ng to about 15 ng, and even more preferably about 0.5 ng to about 4 ng.

Because the preferable amounts of the first liquid, the second liquid and the third liquid applied per pixel are in the above range, the amount per drop of the first liquid, the second liquid and the third liquid are preferably each about 0.01 ng to about 25 ng.

The invention is applicable to an inkjet recording apparatus where a nozzle of the recording head can spray drops of multiple volumes, and the above amount per drop (mass) refers to the smallest drop sized achievable for printing in such an apparatus.

When single sided printing a preferred embodiment is one where parts are provided which enable the application ratio per pixel to be: preferably first liquid: second liquid=about 100:5 to about 100:100; more preferably first liquid: second liquid=about 100:5 to about 100:50; and, still more preferably first liquid: second liquid=about 100:10 to about 100:20.

When double sided printing a preferred embodiment is one where parts are provided which enable the application ratio per pixel to be: preferably first liquid: third liquid=about 100:1 to about 100:50; more preferably first liquid: third liquid=about 100:1 to about 100:25; and, still more preferably first liquid: third liquid=about 100:2 to about 100:15.

In the invention, as the recording medium onto which the first and second and third liquids are ejected plain paper, ordinary inkjet paper, coated paper, glossy paper, films for inkjet use and the like can be used. However, depending on the type of recording medium, the coagulation and permeability varies, and so the application amounts of the first, second and third liquids are preferably adjusted according to the recording medium type.

EXAMPLES

Examples of the invention will now be described, but the invention is not limited to these examples.

<Pigment Modification Method 1>

Six parts by mass of a salt in which a styrene-methacrylic acid copolymer has been neutralized with an alkali metal is added to 30 parts by mass of carbon black (MOGUL L available from Cabot Corporation). Ion exchange water is added to the resultant mixture so that the total amount of the resultant becomes 300 parts by mass. Ultrasound is applied to the resultant liquid with an ultrasonic homogenizer to disperse the pigment in a liquid. Then, the resultant dispersion liquid is centrifuged with a centrifugal separator and 100 parts by mass of the residue liquid is removed.

<Pigment Modification Method 2>

100 g of a pigment is added to an aqueous sulfanilic acid solution which is heated and is being stirred. The mixture, which is being stirred, is cooled to room temperature, and 14 g of a concentrated nitric acid is dripped into the mixture. 10 g of an aqueous $NaNO_2$ solution is added to the mixture. The resultant liquid is stirred until the reaction is completed. The obtained pigment is desalted. Ion exchange water is added to the surface-treated pigment such that the pigment content becomes 12% by mass. Then, the pH value of the mixture is adjusted to 7.5, and the mixture is dispersed with an ultrasonic homogenizer. The resultant dispersion liquid is centrifuged at 8,000 rpm for 30 minutes with a centrifugal separator and residue liquid, the ratio of which to the total amount is 20%, is removed.

<Preparation Method of the Liquids>

Coloring material solutions, water soluble solvents, surfactants, ion exchange water and the like are added in appropriate amounts to make predetermined compositions, and the liquid mixtures are mixed and stirred. The obtained liquid is passed through a 5 μm filter to obtain the desired liquid.

(Liquid A: First Liquid)

| | |
|---|---|
| Cabojet-300 (having a carboxylate group and available from Cabot Corporation) | 4% by mass |
| Styrene-acrylic acid copolymer (having an acid value of 100 and a degree of neutralization of 95%) | 0.5% by mass |
| Diethylene glycol | 25% by mass |
| Acetylene glycol-ethylene oxide adduct | 0.4% by mass |
| Ion exchange water | Remaining portion |

Liquid A has a pH value of 7.4, a surface tension of 31 mN/m, and a viscosity of 3.2 mPa·s.

(Liquid B: First Liquid)

| | |
|---|---|
| Cabojet-200 (having a sufonate group and available from Cabot Corporation) | 4% by mass |
| Styrene-methacrylic acid copolymer (having an acid value of 120 and a degree of neutralization of 90%) | 0.7% by mass |
| Diethylene glycol | 20% by mass |
| Glycerine | 5% by mass |
| Acetylene glycol-ethylene oxide adduct | 0.5% by mass |
| Ion exchange water | Remaining portion |

Liquid B has a pH value of 8.0, a surface tension of 31 mN/m, and a viscosity of 3.4 mPa·s.

(Liquid C: First Liquid)

Liquid C is made of the following components in accordance with a predetermined method and with a pigment treated in accordance with the pigment modification method 1.

| | |
|---|---|
| Mogul L (pigment with no surface functional group, available from Cabot Corporation) | 4% by mass |
| Styrene-methacrylic acid copolymer (having an acid value of 250, and a degree of neutralization of 80%) | 0.7% by mass |
| Diethylene glycol | 20% by mass |
| Diglycerin-ethylene oxide adduct | 5% by mass |
| Polyoxyethylene-2-ethylhexyl ether | 0.5% by mass |
| Ion exchange water | Remaining portion |

Liquid C has a pH value of 8.1, a surface tension of 34 mN/m, and a viscosity of 2.9 mPa·s.

(Liquid D: First Liquid)

Liquid D is made of the following components in accordance with a predetermined method. The used pigment is treated according to the pigment modification method 2.

| | |
|---|---|
| C.I. Pigment Blue 15:3 (having a sulfonate group) | 4% by mass |
| Styrene-acrylic acid copolymer (having an acid value of 100, and a degree of neutralization of 95%) | 0.6% by mass |
| Diethylene glycol | 20% by mass |
| Propylene glycol | 5% by mass |
| Acetylene glycol-ethylene oxide adduct | 1% by mass |
| Ion exchange water | Remaining portion |

Liquid D has a pH value of 7.4, a surface tension of 32 mN/m, and a viscosity of 3.1 mPa·s.

(Liquid E: First Liquid)

Liquid E is made of the following components in accordance with a predetermined method. The pigment used is treated according to the pigment modification method 2.

| | |
|---|---|
| C.I. Pigment Red 122 (having a sulfonate group) | 4% by mass |
| Styrene-acrylic acid copolymer (having an acid value of 100, and a degree of neutralization of 95%) | 0.6% by mass |
| Diethylene glycol | 20% by mass |
| Triethylene glycol | 5% by mass |
| Acetylene glycol-ethylene oxide adduct | 1% by mass |
| Ion exchange water | Remaining portion |

Liquid E has a pH value of 7.6, a surface tension of 32 mN/m, and a viscosity of 3.2 mPa·s.

(Liquid F: First Liquid)

Liquid F is made of the following components in accordance with a predetermined method. The pigment used is treated according to the pigment modification method 2.

| | |
|---|---|
| C.I. Pigment Yellow 128 (having a sulfonate group) | 4% by mass |
| Styrene-acrylic acid copolymer (having an acid value of 100, and a degree of neutralization of 95%) | 0.6% by mass |
| Diethylene glycol | 20% by mass |
| 2-pyrrolidone | 5% by mass |
| Acetylene glycol-ethylene oxide adduct | 1% by mass |
| Ion exchange water | Remaining portion |

Liquid F has a pH value of 7.8, a surface tension of 32 mN/m, and a viscosity of 2.9 mPa·s.

(Liquid G: Second or Third Liquid)

| | |
|---|---|
| Diethylene glycol | 30% by mass |
| Magnesium nitrate-6 hydrates | 7.5% by mass |
| Acetylene glycol-ethylene oxide adduct | 1% by mass |
| Ion exchange water | Remaining portion |

Liquid G has a pH value of 5.6, surface tension of 31 mN/m, and a viscosity of 2.9 mPa·s.

(Liquid H: Second or Third Liquid)

| | |
|---|---|
| Diethylene glycol | 30% by mass |
| 2-pyrrolidone-5-carboxylic acid | 7.5% by mass |
| Sodium Hydroxide | 0.5% by mass |
| Acetylene glycol-ethylene oxide adduct | 0.75% by mass |
| Ion exchange water | Remaining portion |

Liquid H has a pH value of 4.1, a surface tension of 31 mN/m, and a viscosity of 3.0 mPa·s.

(Liquid I: second or third liquid)

| | |
|---|---|
| C.I. Pigment Blue 15:3 (having a sulfonate group) | 4% by mass |
| Diethylene glycol | 20% by mass |
| Propylene glycol | 5% by mass |
| 2-pyrrolidone-5-carboxylic acid | 6% by mass |
| Sodium Hydroxide | 0.75% by mass |
| Acetylene glycol-ethylene oxide adduct | 1% by mass |
| Ion exchange water | Remaining portion |

Liquid I has a pH value of 3.6, a surface tension of 32 mN/m, and a viscosity of 3.1 mPa·s.

(Liquid J: Second or Third Liquid)

Liquid J is made of the following components in accordance with a predetermined method. The pigment used is treated according to the pigment modification method 2.

| | |
|---|---|
| C.I. Pigment Red 122 (having a sulfonate group) | 4% by mass |
| Diethylene glycol | 20% by mass |
| Triethylene glycol | 5% by mass |
| 2-pyrrolidone-5-carboxylic acid | 3% by mass |
| Sodium Hydroxide | 0.38% by mass |
| Acetylene glycol-ethylene oxide adduct | 1% by mass |
| Ion exchange water | Remaining portion |

Liquid J has a pH value of 3.8, a surface tension of 32 mN/m, and a viscosity of 3.2 mPa·s.

(Liquid K: Second Or Third Liquid)

| | |
|---|---|
| C.I. Acid Blue 9 (dye) | 3.5% by mass |
| Diethylene glycol | 20% by mass |
| 1,5-Pentanediol | 5% by mass |
| Diethylene glycol monobutyl ether | 2.5% by mass |
| Acetylene glycol-ethylene oxide adduct | 1% by mass |
| Sodium hydroxide | 0.4% by mass |
| 2-Pyrrolidone-5-carboxylic acid | 3% by mass |
| Ion exchange water | Remaining portion |

Liquid K has a pH value of 3.5, a surface tension of 30 mN/m, and a viscosity of 3.1 mPa·s.

(Liquid L: Second or Third Liquid)

| | |
|---|---|
| C.I. Acid Red 52 (dye) | 3.5% by mass |
| Diethylene glycol | 20% by mass |
| 1,5-Pentanediol | 5% by mass |
| Diethylene glycol monobutyl ether | 2.5% by mass |
| Acetylene glycol-ethylene oxide adduct | 1% by mass |

-continued

| | |
|---|---|
| Sodium hydroxide | 0.2% by mass |
| 2-Pyrrolidone-5-carboxylic acid | 1.5% by mass |
| Ion exchange water | Remaining portion |

Liquid K has a pH value of 4.5, a surface tension of 30 mN/m, and a viscosity of 3.1 mPa·s.

(Liquid M: Similar to the Second or Third Liquids Except that it is made without a Coagulant)

| | |
|---|---|
| Diethylene glycol | 20% by mass |
| Diglycol-ethylene oxide adduct | 10% by mass |
| Acetylene glycol-ethylene oxide adduct | 1% by mass |
| Ion exchange water | Remaining portion |

Liquid M has a pH value of 5.3, a surface tension of 31 mN/m, and a viscosity of 2.8 mPa·s.

(Liquid N: First Liquid)

| | |
|---|---|
| Cabojet-300 (having a carboxylate group and available from Cabot Corporation) | 4% by mass |
| Styrene-acrylic acid copolymer (having an acid value of 110 and a degree of neutralization of 80%) | 1.5% by mass |
| Diethylene glycol | 18% by mass |
| Acetylene glycol-ethylene oxide adduct | 0.75% by mass |
| Ion exchange water | Remaining portion |

Liquid N has a pH value of 8.2, a surface tension of 31 mN/m, and a viscosity of 3.3 mPa·s.

<Evaluation>

In order to print an image, a printing method is conducted in which the second or third liquid is ejected and then on top of this the first liquid is ejected onto $C^2$ paper (manufactured by Fuji Xerox Co., Ltd.) with a piezo print head serving as a trial product and having 256 nozzles and a resolution of 800 dpi. Images are printed in single sided mode and in double sided mode by ejecting the first, second and third liquids and then, the obtained images are evaluated. These printing processes are carried out under ambient conditions (temperature of 23±0.5° C. and humidity of 55±5% R.H.)

Figure 3:
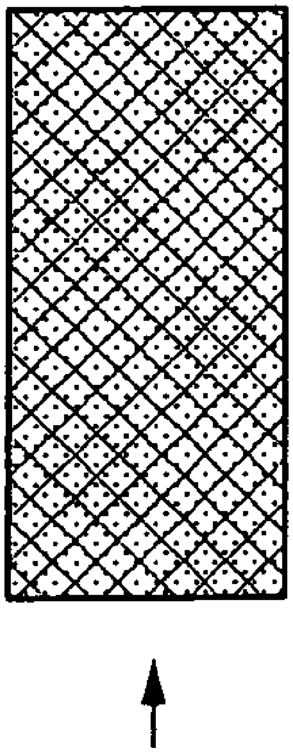
FIG. 3 is a schematic diagram of an image pattern A made by the first, second and third liquids.
Figure 4:
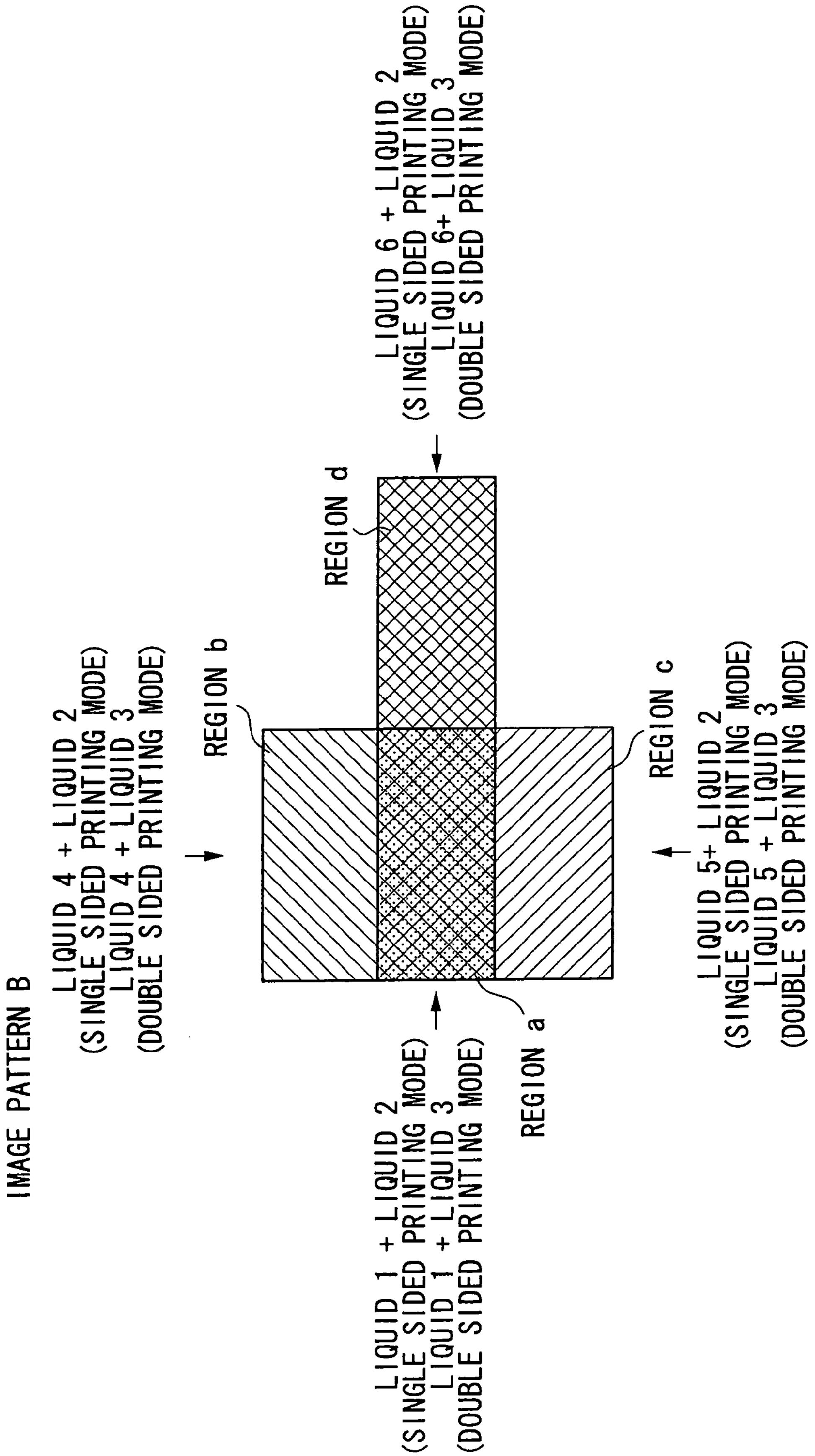
FIG. 4 is a schematic diagram of an image pattern B made by the first, second and third liquids.
Figure 5:
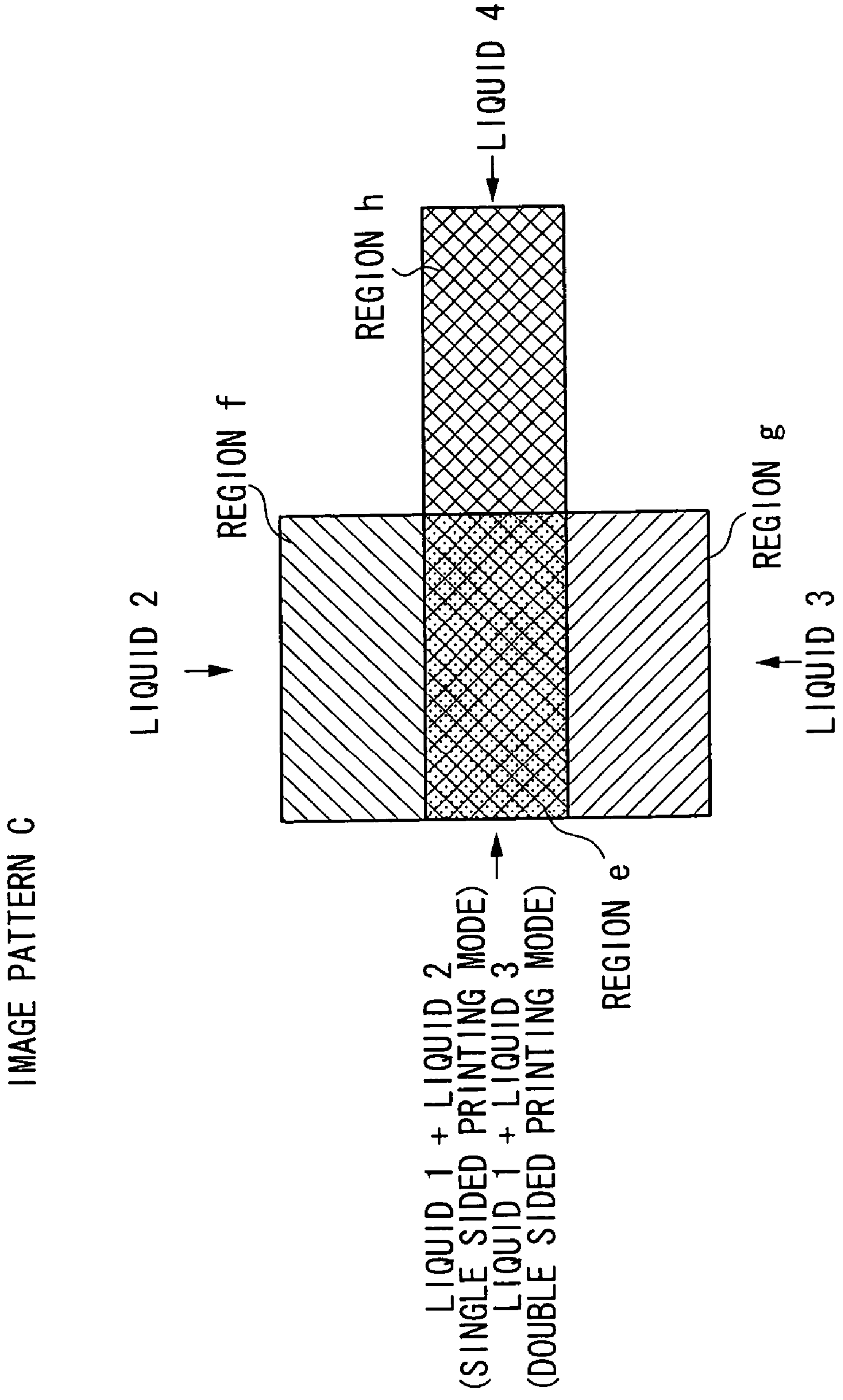
FIG. 5 is a schematic diagram of an image pattern C made by the first, second and third liquids.

The above-described image printing is conducted according to printing patterns shown in each of schematic views of FIGS. 3 to 5, and samples of the resultant images are evaluated after being left under the ambient conditions for 24 hours.

The image pattern A in FIG. 3 it is shown that the area of application of the second or third liquid, and the first liquid overlap. In the single sided mode the second liquid is used, and in the double sided mode the third liquid is used. Also the image pattern B in FIG. 4 and the image pattern C in FIG. 5 show regions in which the second or the third liquids are applied, and regions in which plural first liquids are applied, in the situation of all or part overlap. Also in the image patterns B and C in the single sided mode the second liquid is used, and in the double sided mode the third liquid is used.

In the image pattern B shown in FIG. 4 there are 4 regions a, b, c, and d, each with the same surface area. Also in the image pattern C shown in FIG. 5 there are 4 regions e, f, g, and h, each with the same surface area.

Examples 1 to 10 and Comparative Examples 1 to 6

The tables 1 to 3 show in Examples 1 to 10 and Comparative Examples 1 to 6, as the ink set: which of each of the liquids A to N are used for the first, second and third liquids when printing; which of the image patterns A to C is formed; the application ratio, amount per unit surface area, and coarse particle count ($P_{1-2}$) of the first and second liquids; the application ratio, amount per unit surface area, and coarse particle count ($P_{1-3}$) of the first and third liquids; the value of $(P_{1-3})/(P_{1-2})$ for each of the types of liquid; the volume average particle size of the coloring materials in the liquid; and the surface tension.

TABLE 1

| | Printed Pattern | Type of Liquid | Single Sided Print Mode: Application Ratio | Single Sided Print Mode: Coarse Particle Count ($P_{1-2}$) | Single Sided Print Mode: Application Amount (g/m$^2$) | Double Sided Print Mode: Application Ratio | Double Sided Print Mode: Coarse Particle Count ($P_{1-2}$) | Double Sided Print Mode: Application Amount (g/m$^2$) | ($P_{1-3}/P_{1-2}$) | Volume Average Particle Size (nm) | Surface Tension (mN/m) |
|---|---|---|---|---|---|---|---|---|---|---|---|
| Example 1 | A | Liquid1 A | A:G = | 9,600 | 12.4 | — | 5,600 | 12.4 | 0.58 | 82 | 31 |
| | | Liquid2 G | 100:19.4 | | 2.4 | A:L = 100:14.5 | | — | | — | 31 |
| | | Liquid3 L | — | | — | | | 1.8 | | — | 30 |
| Example 2 | A | Liquid1 A | A:H = | 7,100 | 12.4 | — | 5,900 | 11.8 | 0.83 | 82 | 31 |
| | | Liquid2 H | 100:21.0 | | 2.6 | A:L = 100:17.8 | | — | | — | 31 |
| | | Liquid3 L | — | | — | | | 2.1 | | — | 30 |
| Example 3 | A | Liquid1 B | B:G = | 9,100 | 12.6 | — | 5,800 | 12.4 | 0.64 | 85 | 31 |
| | | Liquid2 G | 100:19.0 | | 2.4 | B:L = 100:17.7 | | — | | — | 31 |
| | | Liquid3 L | — | | — | | | 2.2 | | — | 30 |
| Example 4 | A | Liquid1 D | D:G = | 7,700 | 12.5 | — | 5,400 | 12.5 | 0.70 | 82 | 32 |
| | | Liquid2 G | 100:19.2 | | 2.4 | D:L = 100:13.6 | | — | | — | 31 |
| | | Liquid3 L | — | | — | | | 1.7 | | — | 30 |
| Example 5 | A | Liquid1 N | N:G = | 4,800,000 | 8.2 | — | 74,500 | 8.0 | 0.016 | 95 | 31 |
| | | Liquid2 G | 100:26.8 | | 2.2 | N:L = 100:2.5 | | — | | — | 31 |
| | | Liquid3 L | — | | — | | | 0.2 | | — | 30 |
| Example 6 | A | Liquid1 N | N:M = | 92,000 | 8.2 | — | 74,500 | 8.0 | 0.81 | 95 | 31 |
| | | Liquid2 G | 100:3.7 | | 0.3 | N:L = 100:2.5 | | — | | — | 31 |
| | | Liquid3 L | — | | — | | | 0.2 | | — | 30 |
| Example 7 | A | Liquid1 A | A:G = | 9,600 | 12.4 | — | 8,800 | 12.4 | 0.92 | 82 | 31 |
| | | Liquid2 G | 100:19.4 | | 2.4 | A:L = 100:18.5 | | — | | — | 31 |
| | | Liquid3 L | — | | — | | | 2.3 | | — | 30 |

TABLE 2

| | Printed Pattern | Type of Liquid | Single Sided Print Mode: Application Ratio | Coarse Particle Count ($P_{1-2}$) | Application Amount (g/m$^2$) | Double Side Print Mode: Application Ratio | Coarse Particle Count ($P_{1-2}$) | Application Amount (g/m$^2$) | ($P_{1-3}/P_{1-2}$) | Volume Average Particle Size (nm) | Surface Tension (mN/m) |
|---|---|---|---|---|---|---|---|---|---|---|---|
| Comparative Example 1 | A | Liquid1 A | A:G = 100:19.4 | 9,600 | 12.4 | — | 11,100 | 12.4 | 1.15 | 82 | 31 |
| | | Liquid2 G | | | 2.4 | A:G = 100:21.0 | | — | | — | 31 |
| | | Liquid3 G | — | | — | | | 2.6 | | — | 31 |
| Comparative Example 2 | A | Liquid1 A | A:M = 100:21.0 | 450 | 12.4 | — | 500 | 12.4 | 1.11 | 82 | 31 |
| | | Liquid2 M | | | 2.6 | A:M = 100:25.0 | | — | | — | 31 |
| | | Liquid3 M | — | | — | | | 3.1 | | — | 31 |
| Comparative Example 3 | A | Liquid1 A | A:G = 100:19.4 | 9,600 | 12.4 | — | 94 | 12.4 | 0.0098 | 82 | 31 |
| | | Liquid2 G | | | 2.4 | A:M = 100:6.0 | | — | | — | 31 |
| | | Liquid3 M | — | | — | | | 0.75 | | — | 31 |
| Comparative Example 4 | A | Liquid1 A | A:G = 100:8.9 | 4,700 | 12.4 | — | 4,900 | 12.4 | 1.04 | 82 | 31 |
| | | Liquid2 G | | | 1.1 | A:G = 100:10.5 | | — | | — | 31 |
| | | Liquid3 G | — | | — | | | 1.3 | | — | 31 |

TABLE 3

| | Printed Pattern | Type of Liquid | Single Sided Print Mode: Application Ratio | Coarse Particle Count ($P_{1-2}$) | Application Amount (g/m$^2$) | Double Sided Print Mode: Application Ratio | Coarse Particle Count ($P_{1-2}$) | Application Amount (g/m$^2$) | ($P_{1-3}/P_{1-2}$) | Volume Average Particle Size (nm) | Surface Tension (mN/m) |
|---|---|---|---|---|---|---|---|---|---|---|---|
| Example 8 | B | Liquid1 A | A:G = 100:19.4 | 9,600 | 12.4 | A:H = 100:21.0 | 7,100 | 12.4 | 0.74 | 82 | 31 |
| | | Liquid2 G | | | 2.4 | | | — | | — | 31 |
| | | Liquid3 H | | | — | | | 2.6 | | — | 31 |
| | | Liquid4 D | | | 12.4 | | | 12.4 | | 82 | 32 |
| | | Liquid5 E | | | 12.4 | | | 12.4 | | 118 | 32 |
| | | Liquid6 F | | | 12.4 | | | 12.4 | | 138 | 32 |
| Example 9 | C | Liquid1 A | A:I = 100:15.3 | 8,800 | 11.8 | A:J = 100:13.6 | 6,400 | 11.8 | 0.73 | 82 | 31 |
| | | Liquid2 I | | | 1.8 | | | 11.7 | | 126 | 32 |
| | | Liquid3 J | | | 11.6 | | | 1.6 | | 134 | 32 |
| | | Liquid4 F | | | 11.4 | | | 11.4 | | 138 | 32 |
| Example 10 | C | Liquid1 A | A:K = 100:16.5 | 7,200 | 12.1 | A:L = 100:14.1 | 6,000 | 12.1 | 0.83 | 82 | 31 |
| | | Liquid2 K | | | 2.0 | | | 12.2 | | — | 30 |
| | | Liquid3 L | | | 11.8 | | | 1.7 | | — | 30 |
| | | Liquid4 F | | | 11.9 | | | 11.9 | | 138 | 32 |
| Comparative Example 5 | B | Liquid1 A | A:H = 100:21.0 | 7,100 | 12.4 | A:G = 100:19.4 | 9,600 | 12.4 | 1.35 | 82 | 31 |
| | | Liquid2 H | | | 2.6 | | | 12.4 | | — | 31 |
| | | Liquid3 G | | | 12.4 | | | 2.4 | | — | 31 |
| | | Liquid4 D | | | 12.4 | | | 12.4 | | 82 | 32 |
| | | Liquid5 E | | | 12.4 | | | 12.4 | | 118 | 32 |
| | | Liquid6 F | | | 12.4 | | | 12.4 | | 138 | 32 |
| Comparative Example 6 | C | Liquid1 A | A:J = 100:13.6 | 6,400 | 11.8 | A:I = 100:15.3 | 8,800 | 11.8 | 1.38 | 82 | 31 |
| | | Liquid2 J | | | 1.6 | | | 11.6 | | 134 | 32 |
| | | Liquid3 I | | | 11.7 | | | 1.8 | | 126 | 32 |
| | | Liquid4 F | | | 11.4 | | | 11.4 | | 138 | 32 |

<<Dirty Images>>

Continuous runs of 100 prints of charts incorporating 100% coverage patterns of the image patterns A to C, as shown in FIGS. 3 to 5, are printed, and the 100$^{th}$ image is compared with the 1$^{st}$ image. The results are shown in Tables 4 and 5.

-Evaluation Criteria-

G1—Absolutely no dirty image arose

G2—No visible dirty image arose

G3—Dirty image arose—but within allowable tolerance

G4—Dirty image arose—outside allowable tolerance

<<Optical Density>>

The optical density of a printing portion of each of samples having an image printed in accordance with the patterns A to C of FIGS. 3 to 5 is measured with an X-RITE 404 manufactured by X-Rite, Inc. Where any portion of the image pattern does not meet the criteria then evaluation is according to the following (for example, if one of the regions printed is a G3 and the remaining areas is a G2, then the sample is evaluated as at G3). A similar principal is applied to the evaluation criteria when evaluating with the other methods below. The results are shown in Tables 4 and 5.

-Evaluation Criteria (Black Ink)-

G1: Optical density is 1.45 or more

G2: Optical density is 1.4 and above but less than 1.45

G3: Optical density is 1.3 and above but less than 1.4

G4: Optical density less than 1.3 (outside allowable tolerance)

-Evaluation Criteria (Color Ink)-

G1: Optical density is 1.2 or more

G2: Optical density is 1.1 and above but less than 1.2

G3: Optical density is 1.0 and above but less than 1.1

G4: Optical density less than 1.1 (outside allowable tolerance)<

<Inter-color Bleeding>>

The evaluation of inter-color bleeding is made by printing a pattern with adjacent different colors (in FIGS. 4 and 5 the patterns B and C). The boundary area is checked for the degree of bleeding against a previously prepared border-line case sample by eye. The results are shown in Table 5.

-Evaluation Criteria-

G1: Bleeding is not perceptible.

G2: Bleeding slightly occurs.

G3: Bleeding occurs but the degree thereof is acceptable.

G4: Significant bleeding occurs and the degree thereof is unacceptable.

<<Bleeding (Feathering)>>

The evaluation of bleeding is made by printing patterns A to C as shown in FIGS. 3, 4 and 5. Then the degree of bleeding of the following boundaries are checked against a previously prepared border-line case sample by eye: the printed region and non-printed region boundary of image pattern A in FIG. 3; the printed region “a” and non-printed region boundary of image pattern B in FIG. 4; the printed region “e” and non-printed region boundary of image pattern C in FIG. 5. The results are shown in Tables 4 and 5.

-Evaluation Criteria-

G1: Bleeding is not perceptible.

G2: Bleeding slightly occurs.

G3: Bleeding occurs but the degree thereof is acceptable.

G4: Significant bleeding occurs and the degree thereof is unacceptable.

<<Drying Times>>

The evaluation of inter-color bleeding is made by printing images of the patterns A to C as shown in FIGS. 3, 4 and 5, with 100% coverage patterns. Then, after a predetermined period of time has elapsed, a separate sheet of $C^2$ paper is placed and applied with a force of $1.9\times10^4$ N/$m^2$. The drying time is the time elapsed until no liquid is transferred to the applied sheet of $C^2$ paper. The results are shown in Tables 4 and 5.

-Evaluation Criteria-

G1: Drying time is less than 0.5 seconds

G2: Drying time is 0.5 seconds or more but less than 1 second

G3: Drying time is 1 second or more but less than 3 seconds

G4: Drying time is 3 seconds or more (unacceptable)

TABLE 4

| | | Dirty Image | Optical Density | Bleeding | Drying Time |
|---|---|---|---|---|---|
| Example 1 | Single Sided Printing | G1 | G1 | G1 | G1 |
| | Double Sided Printing | G1 | G2 | G2 | G1 |
| Example 2 | Single Sided Printing | G1 | G2 | G2 | G1 |
| | Double Sided Printing | G1 | G2 | G2 | G1 |
| Example 3 | Single Sided Printing | G1 | G1 | G1 | G1 |
| | Double Sided Printing | G1 | G2 | G2 | G1 |
| Example 4 | Single Sided Printing | G1 | G1 | G1 | G1 |
| | Double Sided Printing | G1 | G2 | G2 | G1 |
| Example 5 | Single Sided Printing | G2 | G1 | G1 | G2 |
| | Double Sided Printing | G2 | G2 | G2 | G2 |
| Example 6 | Single Sided Printing | G1 | G1 | G1 | G1 |
| | Double Sided Printing | G1 | G1 | G1 | G1 |
| Example 7 | Single Sided Printing | G1 | G1 | G1 | G1 |
| | Double Sided Printing | G2 | G1 | G1 | G2 |
| Comparative Example 1 | Single Sided Printing | G1 | G1 | G1 | G1 |
| | Double Sided Printing | G4 | G1 | G1 | G3 |
| Comparative Example 2 | Single Sided Printing | G1 | G4 | G4 | G1 |
| | Double Sided Printing | G1 | G4 | G4 | G1 |
| Comparative Example 3 | Single Sided Printing | G1 | G1 | G1 | G1 |
| | Double Sided Printing | G1 | G4 | G4 | G1 |
| Comparative Example 4 | Single Sided Printing | G2 | G4 | G4 | G2 |
| | Double Sided Printing | G2 | G4 | G4 | G2 |

TABLE 5

| | | Dirty Image | Optical Density | Bleeding | Inter Color Bleeding | Drying Time |
|---|---|---|---|---|---|---|
| Example 8 | Single Sided Printing | G1 | G1 | G1 | G1 | G1 |
| | Double Sided Printing | G1 | G2 | G2 | G2 | G1 |
| Example 9 | Single Sided Printing | G1 | G1 | G1 | G1 | G1 |
| | Double Sided Printing | G1 | G2 | G2 | G2 | G1 |
| Example 10 | Single Sided Printing | G1 | G1 | G1 | G1 | G1 |
| | Double Sided Printing | G1 | G2 | G2 | G2 | G1 |
| Comparative Example 5 | Single Sided Printing | G1 | G1 | G1 | G1 | G1 |
| | Double Sided Printing | G4 | G1 | G1 | G2 | G3 |
| Comparative Example 6 | Single Sided Printing | G1 | G2 | G2 | G2 | G1 |
| | Double Sided Printing | G4 | G1 | G1 | G1 | G1 |

As is shown in the Tables 4 and 5, in the inkjet recording method of the invention and the inkjet recording apparatus of the invention, the liquids which correspond to the first liquid and the second liquid, and the liquids which correspond to the first liquid and the third liquid, printed by ejecting onto the recording medium so that they make contact with each other as in the Examples 1 to 10 form images which are superior images with sufficient optical density, no dirty images, and no bleeding or inter-color bleeding. As well as this the drying time is sufficiently short.

In comparison it is clear that, as shown in the Tables 4 and 5, the liquids which correspond to the first liquid and the second liquid, and the liquids which correspond to the first liquid and the third liquid, printed by ejecting onto the recording medium so that they make contact with each other as in the Comparative Examples 1 to 6, form images which are unacceptable in terms of at least one of optical density, dirty images, bleeding, inter-color bleeding or drying time.

What is claimed is:

1. An inkjet recording method which prints out by ejecting onto a recording medium an ink set for inkjet use, wherein the ink set comprises at least:

a first liquid containing at least a coloring material, a water soluble solvent and water;

a second liquid containing at least a coagulant, a water soluble solvent and water; and a third liquid containing at least a coagulant, a water soluble solvent and water; wherein, (A) printing modes comprise a single sided printing mode and a double sided printing mode, (B) when the single sided printing mode is selected printing is carried out by ejecting the first liquid and the second liquid, (C) when the double sided printing mode is selected printing is carried out by ejecting the first liquid and the third liquid, (D) the relationship $0.01<(P_{1-3})/(P_{1-2})<1$ is substantially satisfied where $(P_{1-2})$ represents the number of coarse particles of size 1 μm or larger in a mixed liquid, mixed in the application ratio per unit of surface area when the single sided printing is selected, of the first liquid and the second liquid, and where $(P_{1-3})$ represents the number of coarse particles of size 1 μm or larger in a mixed liquid, mixed in the application ratio per unit of surface area when the double sided printing is selected, of the first liquid and the third liquid.

2. The inkjet recording method according to claim 1 wherein, the number of coarse particles $(P_{1-2})$ and the number of coarse particles $(P_{1-3})$ are both about 5,000 to about 5,000,000 particles per μl.

3. The inkjet recording method according to claim 1 wherein, for printing of the same color, the application amount of liquid per pixel in the single sided printing mode is substantially the same as or more than the application amount of liquid per pixel in the double sided printing mode.

4. The inkjet recording method according to claim 1 wherein, the application ratio per unit surface area is adjusted to an appropriate amount, by adjusting the number of pixels applied of the first liquid and/or the second liquid, for printing in the single sided printing mode; and, the application ratio per unit surface area is adjusted to an appropriate amount, by adjusting the number of pixels applied of the first liquid and/or the third liquid, for printing in the double sided printing mode.

5. The inkjet recording method according to claim 1 wherein, the application ratio per unit surface area is adjusted to an appropriate amount, by adjusting the amount of the first liquid and/or the second liquid applied per pixel, for printing in the single sided printing mode; and, the application ratio per unit surface area is adjusted to an appropriate amount, by adjusting the amount of the first liquid and/or the third liquid applied per pixel, for printing in the double sided printing mode.

6. The inkjet recording method according to claim 5 wherein, the amount of the first liquid and/or the second liquid applied per pixel, is adjusted by changing the shape of the wave of the voltage applied to the first liquid and/or the second liquid; and, the amount of the first liquid and/or the third liquid applied per pixel is adjusted by changing the shape of the wave of the voltage applied to the first liquid and/or the third liquid.

7. The inkjet recording method according to claim 1 wherein, the amounts of the first liquid, the second liquid and the third liquid applied per pixel are each about 0.01 ng to about 25 ng.

8. The inkjet recording method according to claim 1 wherein, in the single sided printing mode, the ratio by mass of the amount of the first liquid to the second liquid applied per pixel is between about 100:5 and about 100:100; and, in the double sided printing mode, the ratio by mass of the amount of the first liquid to the third liquid applied per pixel is between about 100:1 and about 100:50.

9. The inkjet recording method according to claim 1 wherein, the first liquid additionally comprises a polymer.

10. The inkjet recording method according to claim 9 wherein, the acid value of the polymer is about 30 KOHmg/g to about 150 KOHmg/g.

11. The inkjet recording method according to claim 1 wherein, the coloring material is a pigment, and the pigment is at least one selected from the group of pigments comprising a pigment which is a dispersion dispersed by a polymer dispersing agent; a pigment which is self dispersible in water; a pigment which has a resin covering; and, a pigment which is a graft polymer pigment.

12. The inkjet recording method according to claim 1 wherein, the volume average particle size of the coloring material is about 30 nm to about 250 nm.

13. An inkjet recording apparatus provided with a recording head which prints out by ejecting onto a recording medium an ink set for inkjet use, wherein the ink set comprises at least:

a first liquid containing at least a coloring material, a water soluble solvent and water;

a second liquid containing at least a coagulant, a water soluble solvent and water; and a third liquid containing at least a coagulant, a water soluble solvent and water; wherein, (A) the apparatus is configured for printing modes comprising a single sided printing mode and a double sided printing mode, (B) when the single sided printing mode is selected printing is carried out by ejecting the first liquid and the second liquid, (C) when the double sided printing mode is selected printing is carried out by ejecting the first liquid and the third liquid, (D) the relationship $0.01<(P_{1-3})/(P_{1-2})<1$ is substantially satisfied, where $(P_{1-2})$ represents the number of coarse particles of size 1 μm or larger of a mixed liquid, mixed in the application ratio per unit of surface area when the single sided printing is selected, of the first liquid and the second liquid, and where $(P_{1-3})$ represents the number of coarse particles of size 1 μm or larger of a mixed liquid, mixed in the application ratio per unit of surface area when the double sided printing is selected, of the first liquid and the third liquid.

14. The inkjet recording apparatus according to claim 13 wherein, the number of coarse particles $(P_{1-2})$ and the number of coarse particles $(P_{1-3})$ are both about 5,000 to about 5,000,000 particles per μl.

15. The inkjet recording apparatus according to claim 13 wherein, for printing of the same color, the application amount of liquid per pixel in the single sided printing mode is substantially the same as or more than the application amount of liquid per pixel in the double sided printing mode.

16. The inkjet recording apparatus according to claim 13 wherein, the application ratio per unit surface area is adjusted to an appropriate amount, by adjusting the number of pixels applied of the first liquid and/or the second liquid, for printing in the single sided printing mode; and, the application ratio per unit surface area is adjusted to an appropriate amount, by adjusting the number of pixels applied of the first liquid and/or the third liquid, for printing in the double sided printing mode.

17. The inkjet recording apparatus according to claim 13 wherein, the application ratio per unit surface area is adjusted to an appropriate amount, by adjusting the amount of the first liquid and/or the second liquid applied per pixel, for printing in the single sided printing mode; and, the application ratio per unit surface area is adjusted to an appropriate amount, by adjusting the amount of the first liquid and/or the third liquid applied per pixel, for printing in the double sided printing mode.

18. The inkjet recording apparatus according to claim 17 wherein, the amount of the first liquid and/or the second liquid applied per pixel, is adjusted by changing the shape of the wave of the voltage applied to the first liquid and/or the second liquid; and, the amount of the first liquid and/or the third liquid applied per pixel is adjusted by changing the shape of the wave of the voltage applied to the first liquid and/or the third liquid.

19. The inkjet recording apparatus according to claim 13 wherein, the amounts of the first liquid, the second liquid and the third liquid applied per pixel are each about 0.01 ng to about 25 ng.

20. The inkjet recording apparatus according to claim 13 wherein, in the single sided printing mode, the ratio by mass of the amount of the first liquid to the second liquid applied per pixel is between about 100:5 and about 100:100; and, in the double sided printing mode, the ratio by mass of the amount of the first liquid to the third liquid applied per pixel is between about 100:1 and about 100:50.

* * * * *